United States Patent
Park et al.

(10) Patent No.: US 12,454,546 B2
(45) Date of Patent: Oct. 28, 2025

(54) INOTODIOL ESTER DERIVATIVE PRECURSOR DRUG

(71) Applicants: CARBOEXPERT INC., Daejeon (KR); THE INDUSTRY & ACADEMIC COOPERATION IN CHUNGNAM NATIONAL UNIVERSITY (IAC), Daejeon (KR)

(72) Inventors: Jongtae Park, Daejeon (KR); Phu Cuong Nguyen, Daejeon (KR); Kyubeen Park, Sejong (KR); Nan Young Lee, Daejeon (KR)

(73) Assignees: CARBOEXPERT INC., Daejeon (KR); THE INUDSTRY & ACADEMIC COOPERATION IN CHUNGNAM NATIONAL UNIVERSITY, Daejeon (KR)

( * ) Notice: Subject to any disclaimer, the term of this patent is extended or adjusted under 35 U.S.C. 154(b) by 458 days.

(21) Appl. No.: 18/019,875

(22) PCT Filed: Aug. 6, 2021

(86) PCT No.: PCT/KR2021/010448
§ 371 (c)(1),
(2) Date: Feb. 6, 2023

(87) PCT Pub. No.: WO2022/031130
PCT Pub. Date: Feb. 10, 2022

(65) Prior Publication Data
US 2023/0279042 A1    Sep. 7, 2023

(30) Foreign Application Priority Data

Aug. 6, 2020 (KR) .................. 10-2020-0098773

(51) Int. Cl.
*C07J 9/00* (2006.01)

(52) U.S. Cl.
CPC .................................... *C07J 9/005* (2013.01)

(58) Field of Classification Search
CPC ....................................................... C07J 9/005
See application file for complete search history.

(56) References Cited

FOREIGN PATENT DOCUMENTS

| CN | 108517001 A | 9/2018 |
| KR | 10-1893754 B1 | 8/2018 |

OTHER PUBLICATIONS

Ma et al., "Anti-inflammatory and anticancer activities of extracts and compounds from the mushroom *Inonotus obliquus*," Food Chemistry, 139: 503-508 (2013).
Hasegawa et al., "Oleoyl triterpene glycoside biotransformed from ginseng suppresses growth and metastasis of murine B16-F10 melanoma via immunostimulation," Journal of Traditional Medicines, 17: 186-193 (2000).
Ferriz et al., "Prodrug design of phenolic drugs," Current Pharmaceutical Design, 16 (2): 2033-2052 (2010).
International Search Report issued in corresponding International Patent Application No. PCT/KR2021/010448 dated Nov. 26, 2021.

*Primary Examiner* — Golam M Shameem
(74) *Attorney, Agent, or Firm* — Morgan, Lewis & Bockius LLP

(57) ABSTRACT

The present disclosure relates to an ester derivative prodrug of inotodiol and use thereof. The prodrug not only has increased solubility with respect to an inorganic solvent and an organic solvent, but also has improved stability, and thus can be used in the treatment of various inflammatory diseases, including inflammatory diseases or allergic diseases.

8 Claims, 28 Drawing Sheets

INOTODIOL ESTER DERIVATIVE PRECURSOR DRUG

TECHNICAL FIELD

The present disclosure relates to an ester derivative prodrug of inotodiol.

BACKGROUND ART

A prodrug refers to a drug that is initially inactive, but is converted into an active form through a metabolic pathway when administered into the body, thereby exhibiting an effect. Regarding a prodrug, the treatment is performed such that a certain therapeutic agent A, which is immediately decomposed when administered into the body, is delivered to target cells or tissues after being in combination of another substance B, and, and then, through a metabolic pathway in the body, B is excreted and only A component remains.

Meanwhile, inotodiol is a compound isolated from an alcohol extract of Inonotus obliquus and has the properties of unsaturated diols. Inotodiol is insoluble in water, has relatively low solubility with respect to an organic solvent, and is unstable and is easily precipitated, and thus has a low absorption rate in the body when administered orally. In addition, a fraction that is not precipitated upon oral administration is easily absorbed in the small intestine, thus being unable to reach the end of the small intestine or the large intestine, and the precipitated inotodiol does not exhibit biological activity and is excreted out of the body.

Therefore, to overcome the above-described obstacles, there is a need to develop an inotodiol prodrug with improved physicochemical, physiological and pharmaceutical properties.

DETAILED DESCRIPTION OF DISCLOSURE

Technical Problem

One aspect is to provide an ester derivative prodrug of inotodiol or a pharmaceutically acceptable salt thereof.

Another aspect is to provide a pharmaceutical composition for the prevention or treatment of an inflammatory disease or an allergic disease, including the prodrug or a pharmaceutically acceptable salt thereof as an active ingredient.

Another aspect is to provide a health functional food for the prevention or amelioration of an inflammatory disease or an allergic disease, including the prodrug or a pharmaceutically acceptable salt thereof as an active ingredient.

Another aspect is to provide a method of preventing or treating an inflammatory disease or an allergic disease, including administering an effective amount of the prodrug or a pharmaceutically acceptable salt thereof to a subject in need thereof.

Technical Solution

One aspect provides an ester derivative prodrug of inotodiol.

One aspect provides an inotodiol ester derivative compound formed through an ester condensation reaction between a hydroxyl group of an inotodiol compound of Formula 1 below and a carboxyl group of a fatty acid, glucuronic acid, alkyl succinic anhydride, or phenolic acid, or a pharmaceutically acceptable salt thereof:

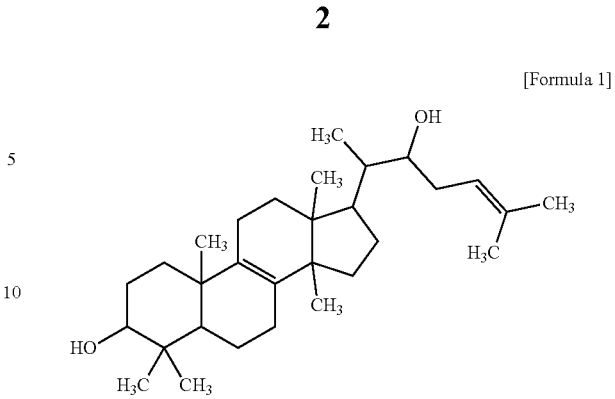

[Formula 1]

One aspect provides a compound represented by Formula 2 below or a pharmaceutically acceptable salt thereof:

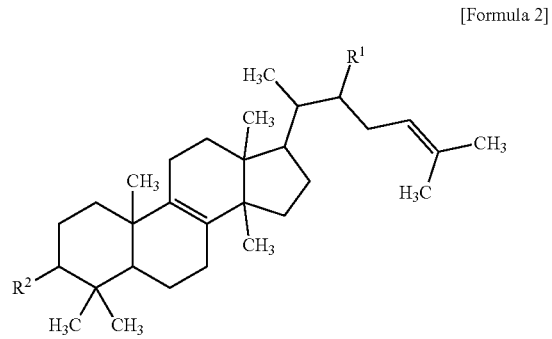

[Formula 2]

wherein, in Formula 2, R1 and R2 are each independently OH, or —OC(O)—R3 wherein R3 is a linear or branched alkyl, alkenyl or alkynyl chain having 1 to 30, 4 to 30, or 6 to 30 carbon atoms, and at least one of R1 and R2 is —OC(O)—R3.

In one embodiment, R3 is an unsubstituted linear alkyl or alkenyl chain having $CH_3(CH_2)_a$— or $CH_3(CH_2)_b(CH=CH[CH_2])_c(CH_2)_d$— wherein a is an integer of 8 to 24, b is an integer of 1 to 5, c is an integer of 1 to 6, and d is an integer of 3 to 7.

The term "prodrug" as used herein may refer to a drug that itself may be biologically inactive, but exhibits an effective medicinal effect after chemical/biochemical structural transformation during the residence time thereof in the body. That is, prodrugs are those that are made possible for clinical use by imparting chemical modification to those having unsuitable properties in terms of side effects, stability, solubility, absorption, and duration of action, although these are useful drugs. An inotodiol derivative according to one embodiment is a compound formed through an ester bond between inotodiol and a fatty acid, and has increased solubility with respect to an inorganic solvent and/or an organic solvent and improved stability, and is easily decomposed into inotodiol and a fatty acid in the small intestine, thus facilitating absorption into the small intestine. For example, the inotodiol derivative may be formed through an ester bond between inotodiol and succinic acid. Specifically, the inotodiol derivative may be synthesized through a condensation reaction between alkyl succinic anhydride and inotodiol in the presence of a p-toluene sulfonic acid catalyst, and a succinic acid ester bond may be induced to all or one or more hydroxyl groups of inotodiol by adding alkyl succinic anhydride in an excess amount compared to inotodiol. After the reaction is completed, p-toluene sulfonic acid is neutralized with sodium bicarbonate and removed. In the inotodiol derivative compound synthesized by the above method, both or at least one of R1 and R2 of Formula 2 form a succinic acid ester bond, whereby water solubility is improved, and the ester bond is easily decomposed, thus being easily absorbed into the small intestine. In addition, in an inotodiol derivative according to another embodiment, the water solubility of inotodiol is increased through an ester bond between inotodiol and a fatty acid, and hydrolysis in the small intestine and absorption into the body are reduced, thereby increasing the probability that the inotodiol derivative can reach the large intestine. Thus, when the inotodiol derivative is decomposed by various microorganisms in the large intestine, inotodiol can exhibit direct pharmacological activity. For example, the inotodiol derivative may be formed through an ester bond between inotodiol and phenolic acid. Specifically, the ester bond of the inotodiol derivative is hydrolyzed in the large intestine to release inotodiol and phenolic acid, and accordingly, various physiological activities of each of inotodiol and phenolic acid can be expected. Therefore, the prodrug according to one aspect enables a reduced dosage of inotodiol and can reduce side effects that may occur when ingested at a high dose.

The inotodiol is a major physiologically active ingredient of Inonotus obliquus, and may be chemically synthesized according to a general method, may be prepared as a pharmaceutically acceptable salt, or may be separated and purified from an Inonotus obliquus extract.

The term "inotodiol" as used herein has the IUPAC name of (3S,5R,10S,13R,14R,17R)-17-[(2S,3R)-3-hydroxy-6-methylhept-5-en-2-yl]-4,4,10,13,14-pentamethyl-2,3,5,6,7,11,12,15,16,17-decahydro-1H-cyclopenta[a]phenanthren-3-ol.

The inotodiol derivative may be synthesized through a chemical or biological method. Specifically, the inotodiol derivative may be synthesized by an esterification reaction between inotodiol and a fatty acid. The fatty acid may be a $C_{10}$-$C_{30}$ unsaturated or saturated fatty acid, and may be selected from the group consisting of $C_1$-$C_{10}$ carboxylic acids or phenolic acids. Examples of the unsaturated fatty acid may include myristoleic acid, palmitoleic acid, sapienic acid, oleic acid, elaidic acid, vaccenic acid, linoleic acid, linoelaidic acid, arachidonic acid, eicosapentaenoic acid, erucic acid, and docosahexaenoic acid. Examples of the saturated fatty acid may include caprylic acid, capric acid, lauric acid, palmitic acid, stearic acid, arachidic acid, behenic acid, lignoceric acid, cerotic acid, and myristic acid. The saturated carboxylic acids may be, for example, formic acid, acetic acid, propionic acid, butyric acid, and succinic acid. The phenolic acids may be, for example, p-coumaric acid, cinnamic acid, ferulic acid, 3,4-dihydroxy benzoic acid, p-hydroxy benzoic acid, vanilic acid, caffeic acid, syringic acid, and sinapinic acids. In one embodiment, the inotodiol derivative may be synthesized by mixing, in a molar ratio of 1:10-30, inotodiol and a fatty acid selected from the group consisting of an unsaturated fatty acid, a saturated fatty acid, and a $C_1$-$C_{10}$ carboxylic acid. For example, the mixing may be performed in a molar ratio of 1:10-30, 1:10-25, 1:10-20, 1:10-15, 1:10-13, 5:10-30, or 5:10-15. In this case, when the mixing ratio of inotodiol and the fatty acid is less than or exceeds the above range, the reaction does not sufficiently occur, resulting in reduced production efficiency of the inotodiol derivative or increased reaction time. In addition, the esterification reaction may be carried out at 55° C. to 65° C. for 48 hours to 96 hours. In this case, when the esterification reaction conditions are less than or exceed the above ranges, it is difficult to completely dissolve the fatty acid, which is a reaction substrate, and thus the reaction hardly occurs, or the esterification reaction efficiency is lowered due to reduced enzymatic activity, and thus, there is a problem in that the inotodiol derivative, which is a final product, cannot be synthesized with a high yield. In addition, after the esterification reaction is completed, the purity of an ester included in the product may be further increased through various known distillation or purification methods.

In addition, the inotodiol derivative may be synthesized by adding a biological enzyme to a mixture of inotodiol and a fatty acid, and the biological enzyme is an enzyme suitable for producing a high-efficiency inotodiol derivative and may be, for example, *Candida antarctica* lipase B (CalB). To increase the yield of the inotodiol derivative, which is a final product, the *Candida antarctica* lipase B may be an immobilized enzyme, rather than a general enzyme, and the immobilized enzyme may be a commercially available product or an enzyme prepared by a general method. In addition, the inotodiol derivative may be synthesized by adding the *Candida antarctica* lipase B in an amount of 400 parts by weight to 500 parts by weight with respect to 100 parts by weight of inotodiol. In this case, when the content of *Candida antarctica* lipase B is less than the above range, there is a problem in that the ester production efficiency is low since the esterification reaction does not sufficiently occur. On the other hand, when the content of *Candida antarctica* lipase B exceeds the above range, there is a problem in that the inotodiol derivative, which is a final product, cannot be synthesized with a high yield, which is not economical.

One aspect provides a composition for the prevention or treatment of an allergic disease, including the prodrug as an active ingredient.

The term "inflammatory disease" as used herein refers to acute and/or chronic inflammatory disease(s). The inflammatory disease may be, for example, selected from the group consisting of dermatitis, conjunctivitis, periodontitis, rhinitis, otitis media, sore throat, tonsillitis, pneumonia, gastric ulcer, gastritis, Crohn's disease, colitis, hemorrhoids, gout, ankylosing spondylitis, rheumatic fever, lupus, fibromyalgia, psoriatic arthritis, osteoarthritis, rheumatoid arthritis, periarthritis, tendinitis, tenosynovitis, peritendinitis, myositis, hepatitis, cystitis, nephritis, sjogren's syndrome, arteriosclerosis, irritable bowel syndrome (IBS), inflammatory bowel disease (IBD), multiple sclerosis, acute inflammatory diseases, and chronic inflammatory diseases.

The term "allergy" as used herein refers to a phenomenon that abruptly occur in vivo caused by an antigen-antibody reaction upon contact with an allergen, which is an allergy-inducing substance. The allergy may be, for example, an allergic disease caused by pollen, house dust mites, drugs, vegetable fibers, bacteria, food, dyes and chemicals, food, or the like.

The allergic disease is caused by allergy, and examples thereof may include urticaria, anaphylaxis, allergic rhinitis, bronchial asthma, atopic dermatitis, drug eruption, drug allergy, and serum sickness. In addition, the allergic disease may include various types of diseases depending on the type of allergen or tissue that causes an allergic response.

The pharmaceutical composition for the prevention or treatment of an allergic disease, according to one aspect, may be formulated for use in the form of oral formulations such as powders, granules, tablets, capsules, suspensions, emulsions, syrups and aerosols, preparations for external application, suppositories, and sterile injection solutions, according to general methods, and for formulation, may include suitable carriers, excipients or diluents that are commonly used in the preparation of a pharmaceutical composition.

The carriers, excipients or diluents may be various compounds or mixtures, including lactose, dextrose, sucrose, sorbitol, mannitol, xylitol, erythritol, maltitol, starch, acacia gum, alginates, gelatin, calcium phosphate, calcium silicate, cellulose, methyl cellulose, micro-crystalline cellulose, polyvinyl pyrrolidone, water, methylhydroxybenzoate, propylhydroxybenzoate, talc, magnesium stearate, mineral oil, and the like.

The pharmaceutical composition may be formulated using generally used diluents or excipients such as fillers, extenders, binders, wetting agents, disintegrating agents, and surfactants.

A solid preparation for oral administration may be prepared by mixing the legumes extract with at least one excipient, for example, starch, calcium carbonate, sucrose or lactose, gelatin, or the like. In addition to simple excipients, lubricants such as magnesium stearate and talc may also be used.

Liquid preparations for oral administration may be suspensions, liquids for internal use, emulsions, syrups, and the like, and may include, in addition to commonly used simple diluents, such as water and liquid paraffin, various types of excipients, for example, a wetting agent, a sweetener, a flavoring agent, a preservative, and the like.

Preparations for parenteral administration include an aqueous sterile solution, a non-aqueous solvent, a suspension, an emulsion, a freeze-dried preparation, and a suppository. As the non-aqueous solvent and the suspension, propylene glycol, polyethylene glycol, a vegetable oil such as olive oil, and an injectable ester such as ethyl oleate may be used. As suppository bases, Witepsol, Macrogol, Tween 20, cacao butter, laurin butter, glycerol gelatin, and the like may be used.

A suitable dose of the pharmaceutical composition for the prevention or treatment of an inflammatory disease or an allergic disease, according to one aspect varies depending on conditions and body weights of patients, severity of disease, types of drugs, administration route, and administration time, but may be appropriately selected by those of ordinary skill in the art. However, to obtain desired effects, the pharmaceutical composition may be administered in an amount of 0.0001 mg/kg to 2,000 mg/kg, preferably 0.001 mg/kg to 2,000 mg/kg, daily. The pharmaceutical composition may be administered once or multiple times a day. The dosage is not intended to limit the scope of the present disclosure.

The pharmaceutical composition for the prevention or treatment of an inflammatory disease or an allergic disease, according to one aspect, may be administered to mammals such as rats, mice, livestock, and humans via various routes. Examples of all administration methods may include oral injection, rectal or intravenous injection, muscular injection, subcutaneous injection, and intrauterine epidural injection or intracerebroventricular injection.

Another aspect provides a health functional food composition or cosmetic composition for the prevention or amelioration of an inflammatory disease or an allergic disease, including the compound or a pharmaceutically acceptable salt thereof as an active ingredient.

The detailed description of the compound is the same as described above.

In the health functional food for the prevention or amelioration of an inflammatory disease or an allergic disease according to one aspect, when the compound is used as an additive for the health functional food, the composition may be directly added or may be used in combination of other foods or food ingredients, and may be appropriately used according to a general method. The amount of the active ingredient to be mixed may be appropriately determined according to the purpose of use such as prevention, health, or treatment.

Formulations of the health functional food may be not only in the form of powder, granules, pills, tablets, and capsules, but also in the form of general foods or beverages.

The type of food is not particularly limited, and examples of foods to which the substance may be added may include meat, sausage, bread, chocolate, candies, snacks, confectioneries, pizza, ramen, other noodles, gums, dairy products including ice cream, various soups, beverages, tea, drinks, alcoholic beverages, and vitamin complexes, and may include all foods in a general sense.

Generally, for the preparation of foods or beverages, the compound may be added in an amount of 15 parts by weight or less, preferably 10 parts by weight or less, with respect to 100 parts by weight of raw materials. However, in the case of long-term ingestion for health and hygienic purposes or for health control purposes, the amount may be below the above range, and since there is no safety problem in that a fraction from a natural substance is used, the active ingredient may also be used in an amount above the range.

In the health functional food according to one aspect, a beverage may contain additional ingredients such as various flavoring agents or natural carbohydrates as in general beverages. The above-described natural carbohydrates may be monosaccharides such as glucose and fructose, disaccharides such as maltose and sucrose, polysaccharides such as dextrin and cyclodextrin, and sugar alcohols such as xylitol, sorbitol, and erythritol. As the sweetener, a natural sweetener such as a thaumatin or *stevia* extract, a synthetic sweetener such as saccharin or aspartame, or the like may be used. The proportion of the natural carbohydrates may range from about 0.01 g to 0.04 g, preferably about 0.02 g to 0.03 g, with respect to 100 mL of the beverage according to the present disclosure.

In addition to the above ingredients, the health functional food for the prevention or amelioration of an allergic disease, according to one aspect, may include various nutritional supplements, vitamins, electrolytes, flavors, colorants, pectic acid and salts thereof, alginic acid and salts thereof, organic acids, a protective colloidal thickener, a pH adjuster, a stabilizer, a preservative, glycerin, alcohols, and a carbonating agent used in carbonated beverages. In addition, a composition for improving sleep of the present disclosure may contain flesh for the preparation of natural fruit juice, fruit juice beverages, and vegetable beverages. These ingredients may be used alone or a combination thereof may be used. The proportion of these additives is not limited, but the amounts of the additives generally range from 0.01 parts by weight to 0.1 parts by weight with respect to 100 parts by weight of the health functional food of the present disclosure.

Advantageous Effects of Disclosure

A prodrug according to one aspect not only has increased solubility with respect to an inorganic solvent and an organic solvent, but also has improved stability, and thus can be used in the treatment of various inflammatory diseases, including inflammatory diseases or allergic diseases.

BRIEF DESCRIPTION OF DRAWINGS

FIG. 5 illustrates the LC-MS/MS results of an oleate prodrug of inotodiol, in which:

FIG. 6 illustrates the LC-MS/MS results of a succinate prodrug of inotodiol, in which:

FIG. 7 illustrates the LC-MS/MS results of a linoleate prodrug of inotodiol, in which:

FIG. 8 illustrates the LC-MS/MS results of a palmitate prodrug of inotodiol, in which:

FIG. 9 illustrates the $^1$H-NMR results of an oleate prodrug of inotodiol, in which:

FIG. 10 illustrates the $^{13}$C-NMR results of an oleate prodrug of inotodiol, in which:

FIG. 11 illustrates the 2D heteronuclear multiple bond correlation (HMBC) results of an oleate prodrug of inotodiol, in which:

FIG. 12 illustrates the DSC results of an oleate prodrug of inotodiol, in which:

FIG. 13 illustrates the DSC results of a succinate prodrug of inotodiol, in which:

FIG. 14 illustrates the FT-IR results of an oleate prodrug of inotodiol, in which:

FIG. 15 illustrates the FT-IR results of a succinate prodrug of inotodiol, in which:

MODE OF DISCLOSURE

Figure 1:
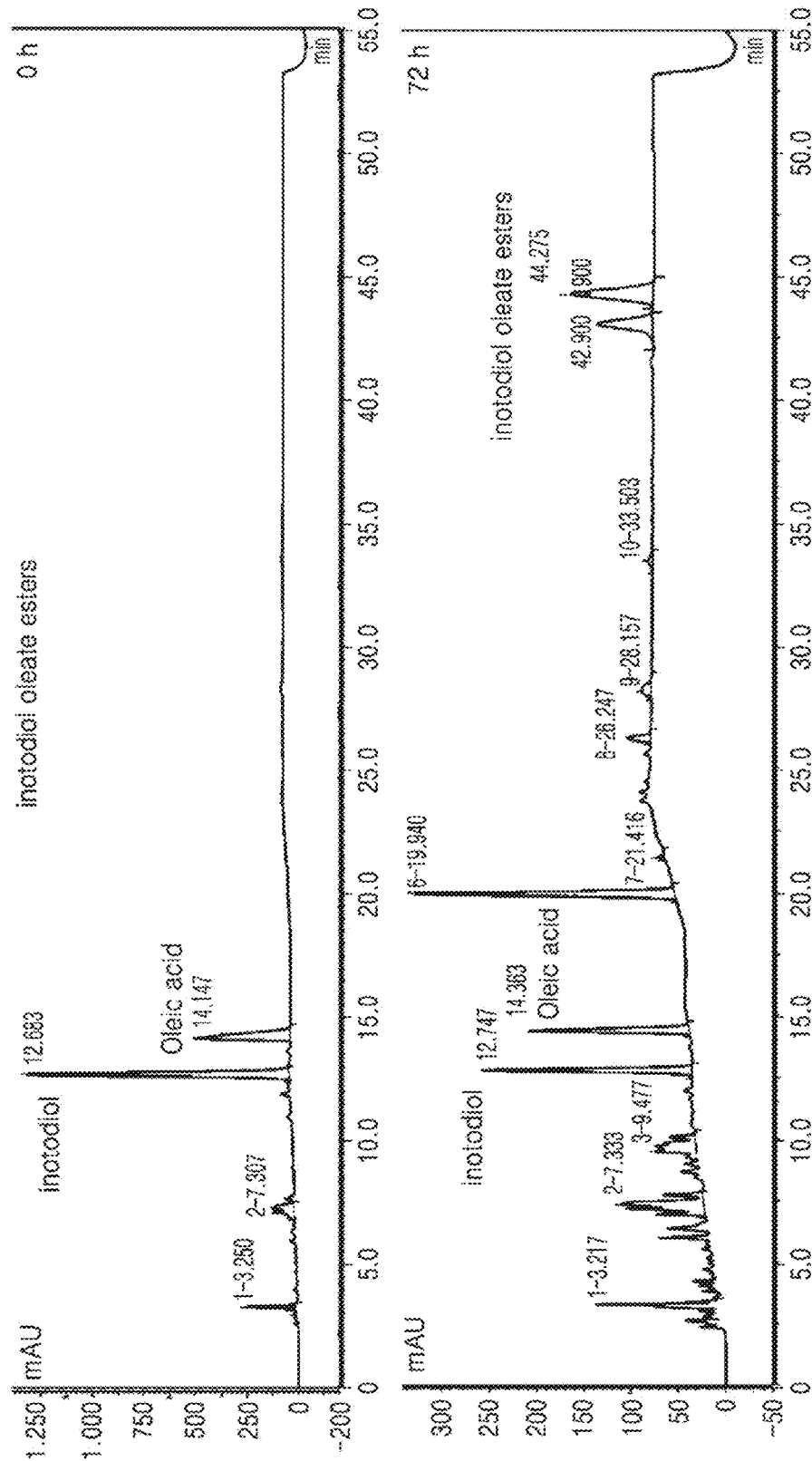
FIG. 1 illustrates the HPLC-ELSD results of an oleate prodrug of inotodiol.

Hereinafter, exemplary examples will be described to aid in understanding of the present disclosure. However, the following examples are provided merely to facilitate the understanding of the present disclosure and are not intended to limit the scope of the present disclosure.

Example 1. Measurement of Water Solubility of Inotodiol

To measure the water solubility of inotodiol, the following was performed.

First, 50 mg of an inotodiol sample was mixed with 1 ml of an organic solvent. Subsequently, the mixture was vortexed and placed in a water bath sonicator for 15 minutes. After standing at 25° C. for 1 hour, centrifugation was performed at 13,000 rpm for 5 minutes. Thereafter, the supernatant was collected and subjected to HPLC-UV-VIS analysis, and the results thereof are shown in Table 1 below.

TABLE 1

| Solvent | Temperature (° C.) | Inotodiol concentration (mg/ml) |
|---|---|---|
| Acetonitrile | 30 | 0.976 |
| Ethyl acetate | 30 | 8.685 |
| Ethanol | 30 | 25.152 |
| Methanol | 30 | 7.964 |
| t-butanol | 30 | 26.493 |
| Hexane | 30 | 0.094 |
| Dichloromethane | 30 | 24.675 |

Example 2. Enzymatic Synthesis and Purification of Inotodiol Fatty Acid Esters

To produce inotodiol esters, various acyl donors, including oleic acid, linoleic acid, palmitic acid and succinic acid, were esterified with inotodiol (molar ratio of inotodiol/acid=1:4) by a lipase reaction.

First, 0.1 mmol of inotodiol and 0.4 mmol of an acid were prepared in a 50 mL glass bottle with a screw cap and dissolved in 5 mL of t-butanol at 60° C. for 30 minutes using a magnetic stirrer (400 rpm). Then, 0.5 mL of an enzyme solution (*Candida antarctica* lipase A) was added to the mixture and the reaction was performed at 60° C. for 72 hours while stirring at 400 rpm during incubation. To stop the reaction, ethanol (10 mL) was added to the reaction solution and maintained at 60° C. for 30 minutes to precipitate lipase. The solution was then filtered to remove the enzyme. Finally, the supernatant was collected and concentrated to a small volume under vacuum using a rotary evaporator (Eyela, Tokyo, Japan).

Then, to purify the esterification product, the concentrated mixture (1 mL) was loaded at a flow rate of 10 ml/min into a glass column (15×250 mm) filed with ODS-AQ C18 (YMCKOREA, Seongnam, Korea) via a preparative HPLC system (LC-Forte/R, YMCKOREA). For the purification of inotodiol oleate ester, inotodiol linoleate ester and inotodiol palmitate ester, the mobile phase was distilled water (solvent A) and methanol:ethanol=1:1 (solvent B) was used and elution was performed with the following gradient elution program: (0-10 min, 90-95% B); (10-25 min, 95-100% B); and (25-80 min, 100% B). In the case of the purification of inotodiol succinate ester, elution was performed with the following gradient elution program: (0-10 min, 0-10% B); (10-30 min, 10-50% B); and (30-80 min, 100% B). Effluent was continuously monitored at a detection wavelength of 210 nm. Peak fractions of inotodiol esters were collected manually by observing the chromatogram.

Experimental Example 1. High-Performance Liquid Chromatography-Evaporative Light Scattering Detector (HPLC-ELSD) Analysis HPLC analysis was performed on an Ultimate 3000 UHPLC system (Ultimate 3000, Dionex, ldstein, Germany) equipped with a RS diode array detector (Dionex) and a YMC-triart C18 column (4.6 mm×250 mm, YMCKOREA, Seongnam, Korea). Chromatographic separation was performed using a binary mobile phase gradient consisting of water (solvent A) and methanol (solvent B). In the case of inotodiol oleate ester, inotodiol linoleate ester and inotodiol palmitate ester, the solvent B gradient was as follows: 0 min, 85%; 7 min, 92%; 15 min, 94%; 20 min, 100%; 50 min, 100%; 50.1 min, 85%; and 55 min, 85%. In the case of inotodiol succinate ester, the solvent B gradient was as follows: 0 min, 0%; 5 min, 5%; 12 min, 50%; 15 min, 100%; 30 min, 100%; 30.1 min, 0%; and 40 min, 0%. The injection volume was 10 μL and elution was monitored at 210 nm. The flow rate was set at 1 mL/min at a column temperature of 50° C.

ELSD analysis was performed on a Waters 1525 Binary HPLC system (Waters Corp.) equipped with an evaporative light scattering detector (Alltech 2000, Deerfield, IL, USA) and a YMC-triart C18 column (4.6 mm×250 mm, YMC-KOREA, Seongnam, Korea). The injection volume was 10 μL and the eluate was monitored by ELSD at a drift-tube temperature of 90° C., the carrier gas flow rate was 2.0 L/min, and the detector was set to 1. The flow rate was set at 1 mL/min at a column temperature of 50° C.

As a result, as illustrated in FIGS. 1 to 4, it can be seen that the synthesis of inotodiol oleate ester, inotodiol linoleate ester, inotodiol palmitate ester, and inotodiol succinate ester, which are prodrugs of inotodiol, is well achieved.

FIG. 1 illustrates the HPLC-ELSD results of an oleate prodrug of inotodiol.

Figure 2:
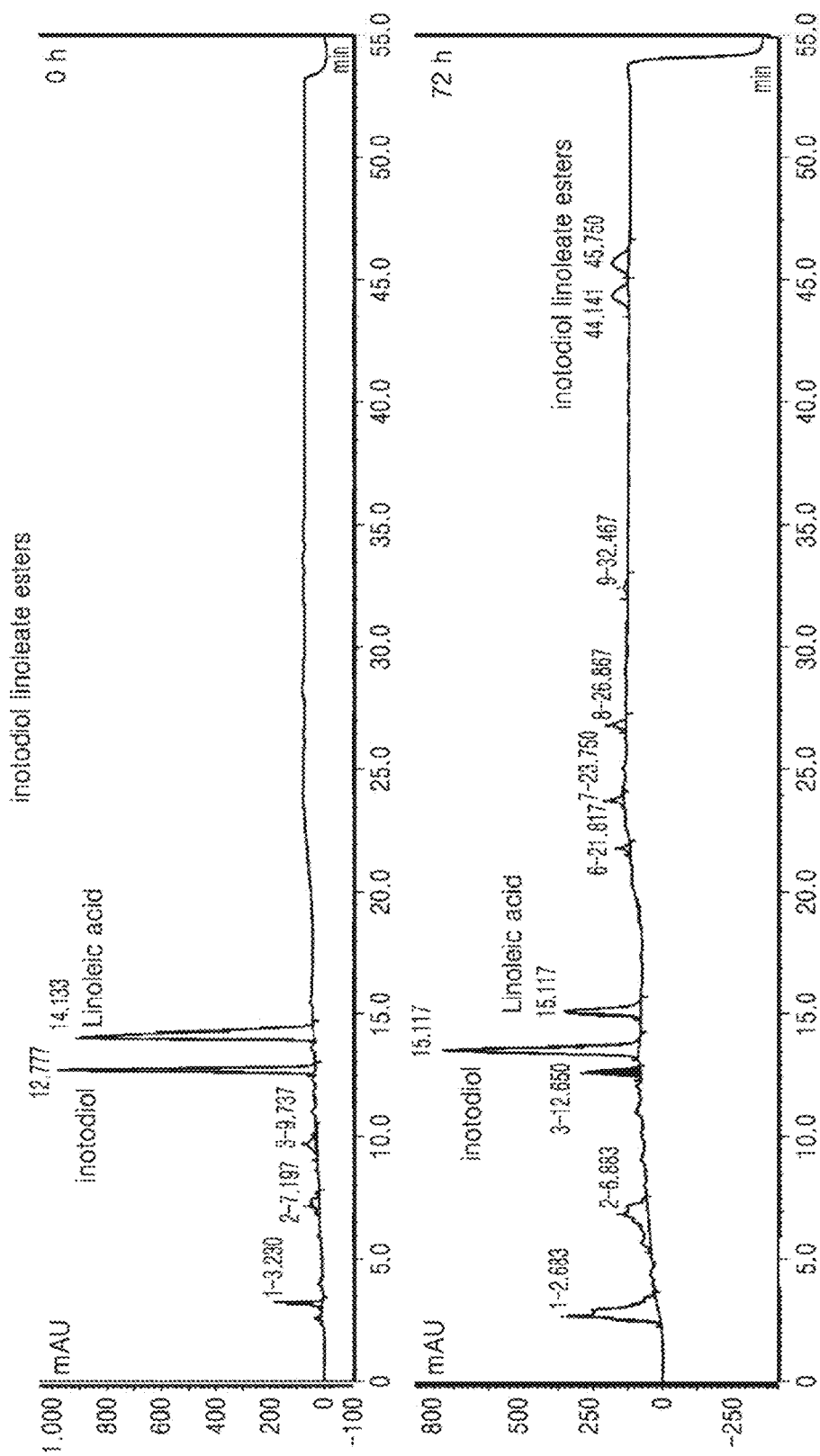
FIG. 2 illustrates the HPLC-ELSD results of a linoleate prodrug of inotodiol.

FIG. 2 illustrates the HPLC-ELSD results of a linoleate prodrug of inotodiol.

Figure 3:
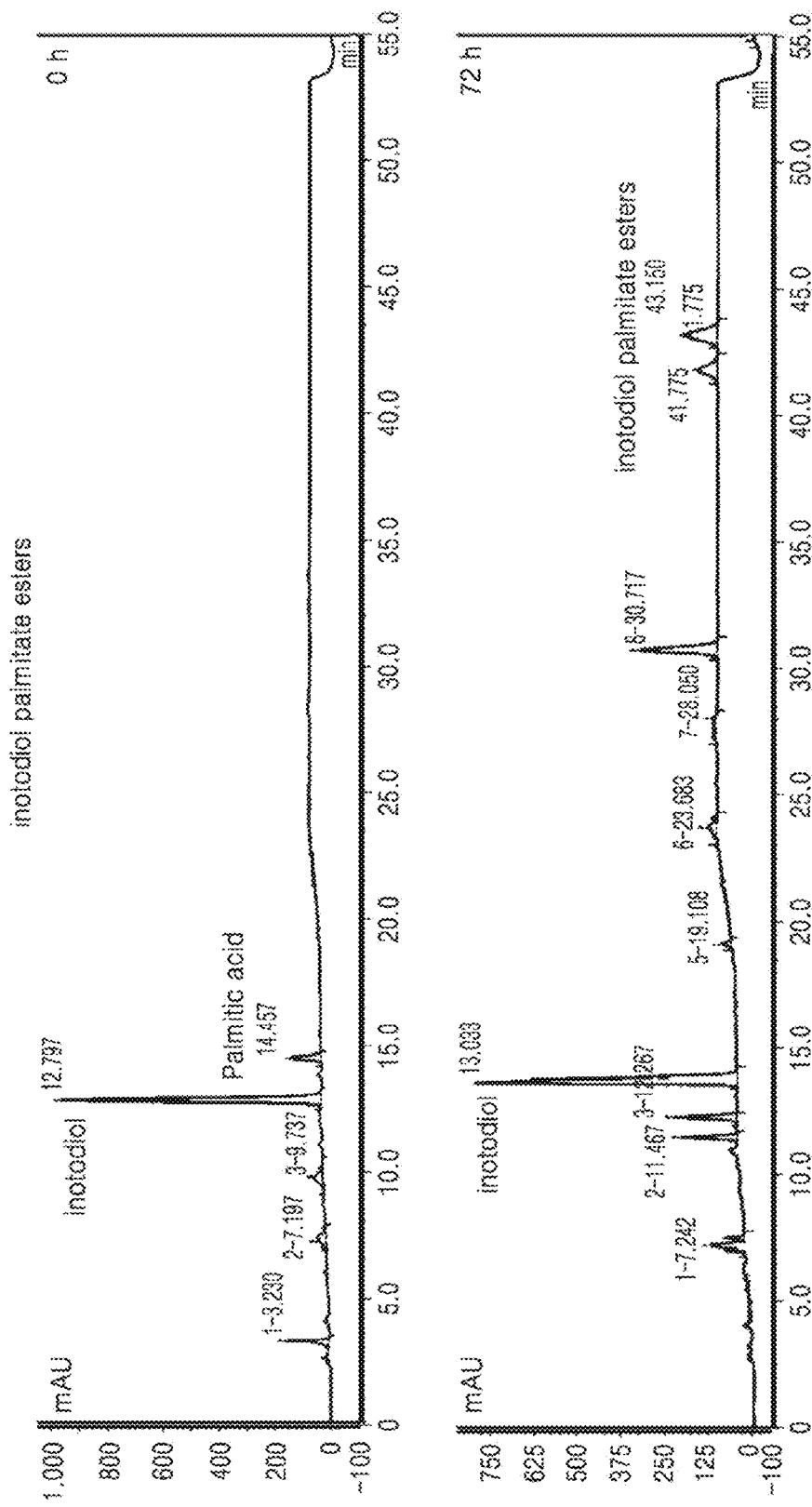
FIG. 3 illustrates the HPLC-ELSD results of a palmitate prodrug of inotodiol.

FIG. 3 illustrates the HPLC-ELSD results of a palmitate prodrug of inotodiol.

Figure 4:
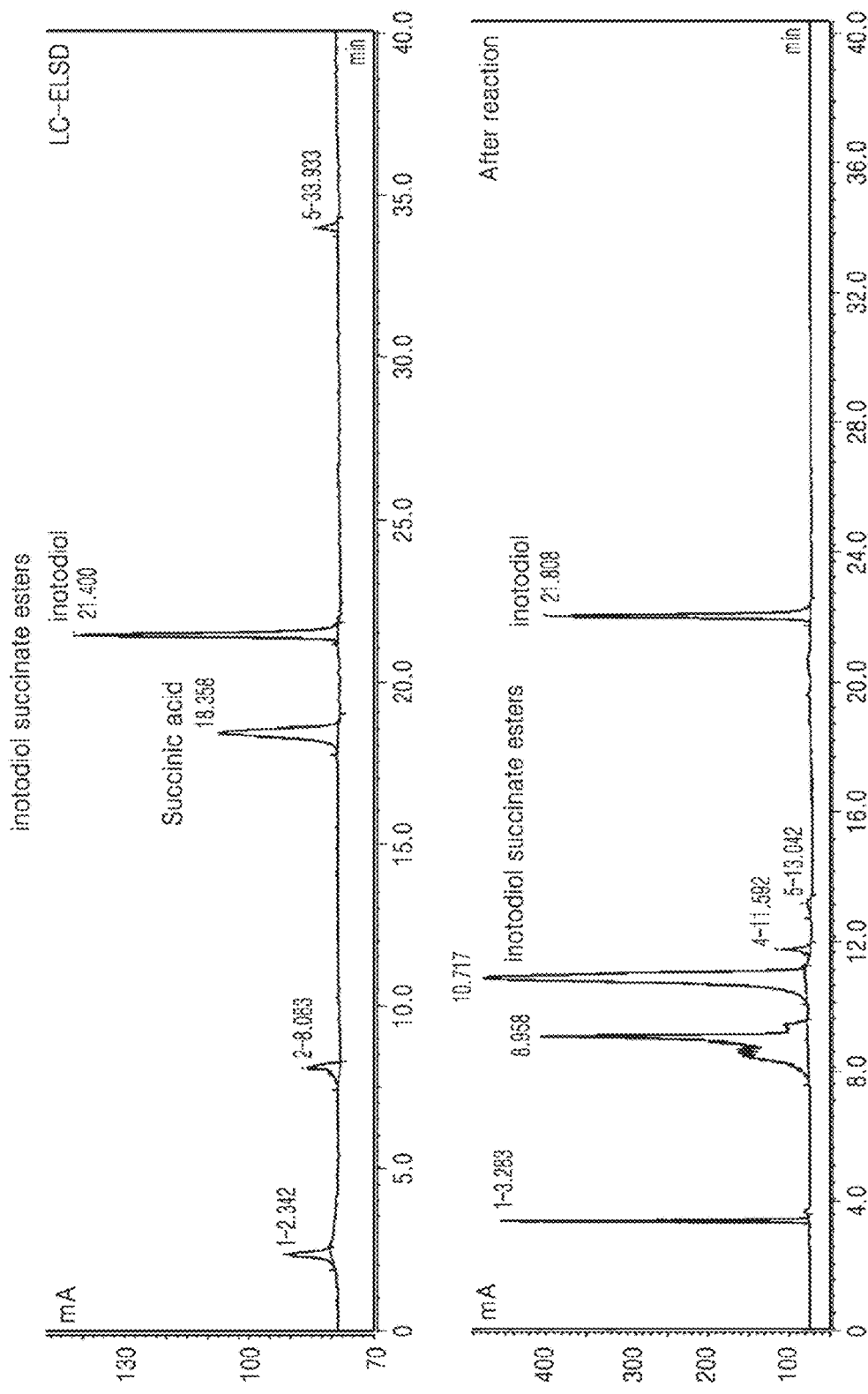
FIG. 4 illustrates the HPLC-ELSD results of a succinate prodrug of inotodiol.

FIG. 4 illustrates the HPLC-ELSD results of a succinate prodrug of inotodiol.

Experimental Example 2. High-Performance Liquid Chromatography Tandem Mass Spectrometry (LC/MS)

Inotodiol esters were identified using Agilent-1290 UPLC/6470A and Agilent-1290 UPLC/6430A QQQ systems (Agilent Technologies Korea, Seoul, South Korea) equipped with an electrospray ionization (ESI) source. The mobile phase was composed of solution A (distilled water) and solution B (methanol) containing 5 mM ammonium acetate and 0.1% formic acid in each solvent. Separation was performed on a column equipped with a Zorbax Eclipse Plus C18 column (2.1×50 mm, 3.5 μm) (Agilent Technologies Korea). The solution B gradient was as follows: 0-2 min, 85%; 7 min, 90%; 18-25 min, 100%; and 26-35 min, 85%. The injection volume was 2 μL and the flow rate was set at 0.2 mL/min at a column temperature of 40° C. The mass spectrometer was run in positive mode with the following parameters: dry gas temperature of 270° C.; dry gas flow rate of 10 L/min; sprayer pressure of 40 psi; sheath gas temperature of 300° C.; sheath gas flow rate of 11 L/min; capillary voltage of 3500 V (positive); and nozzle voltage of 500 V (positive).

As a result, as illustrated in FIGS. 5 to 8, specific peaks of inotodiol oleate ester, inotodiol linoleate ester, inotodiol palmitate ester, and inotodiol succinate ester, which are prodrugs of inotodiol, were confirmed.

Figure 5A:
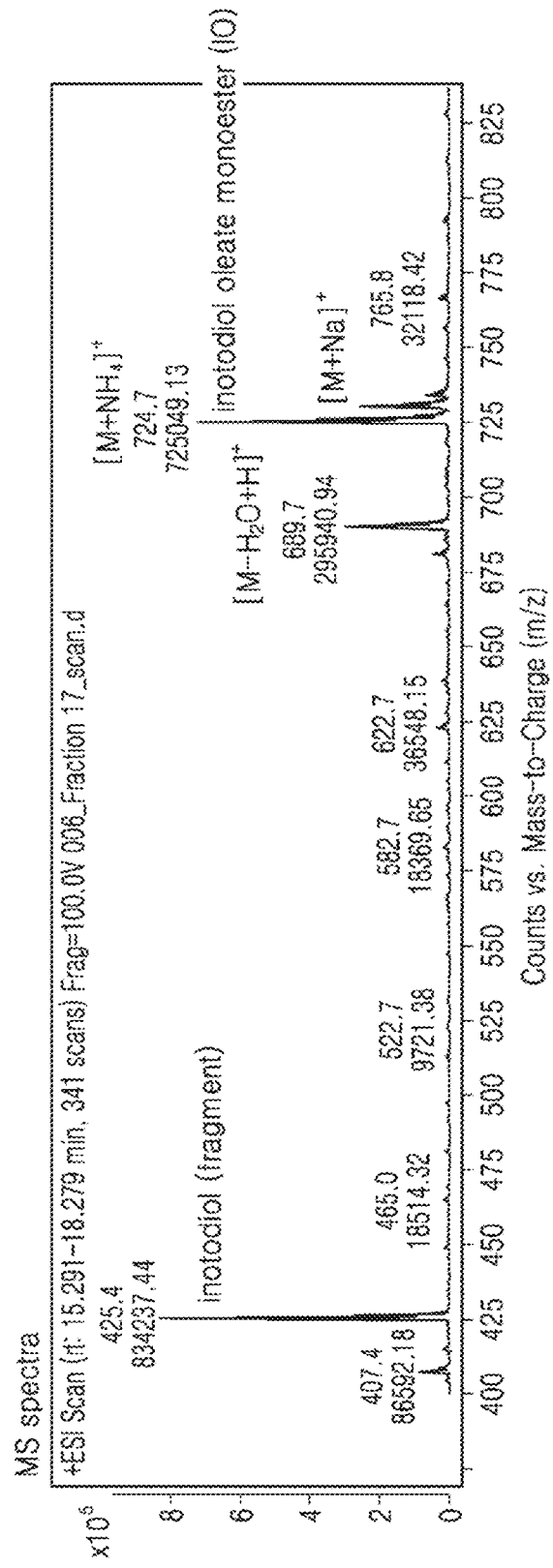
FIG. 5A illustrates the results of confirming the molecular weight of inotodiol oleate ester.
Figure 5B:
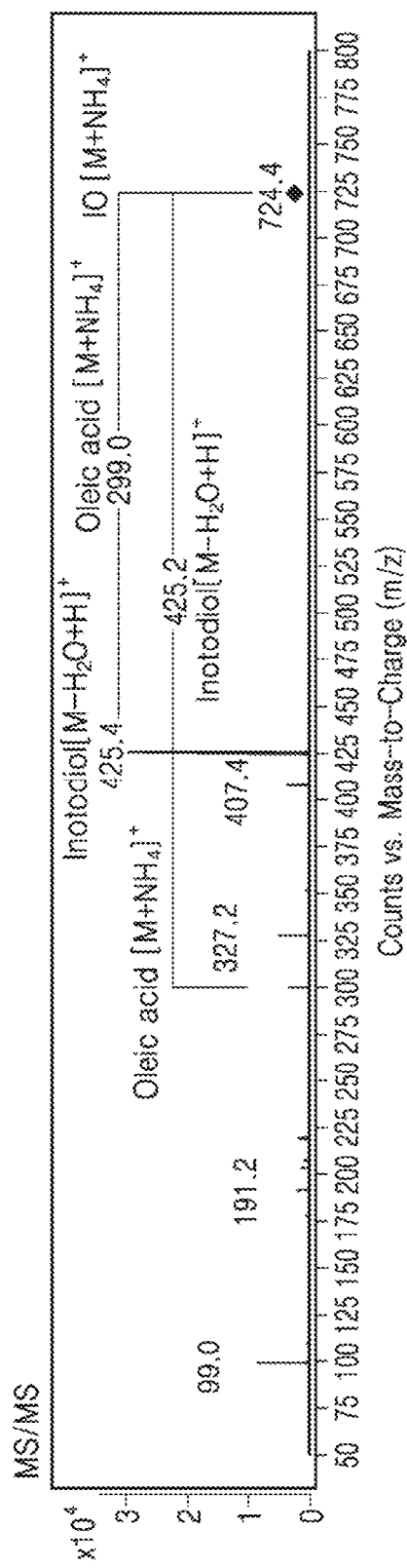
FIG. 5B illustrates the fragment pattern of the inotodiol oleate ester.

FIG. 5A illustrates the results of confirming the molecular weight of inotodiol oleate ester, and FIG. 5B illustrates the fragment pattern of the inotodiol oleate ester.

Figure 6A:
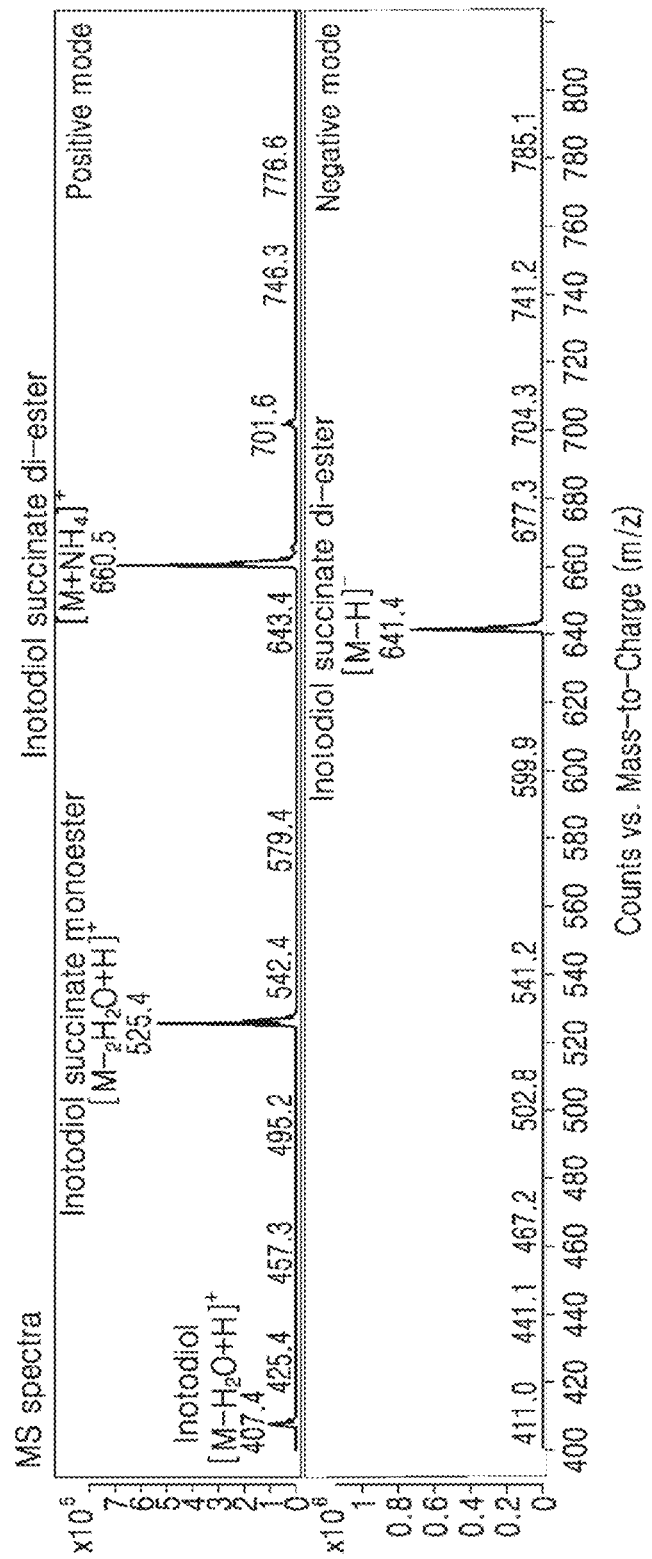
FIG. 6A illustrates the results of confirming the molecular weight of inotodiol succinate ester.
Figure 6B:
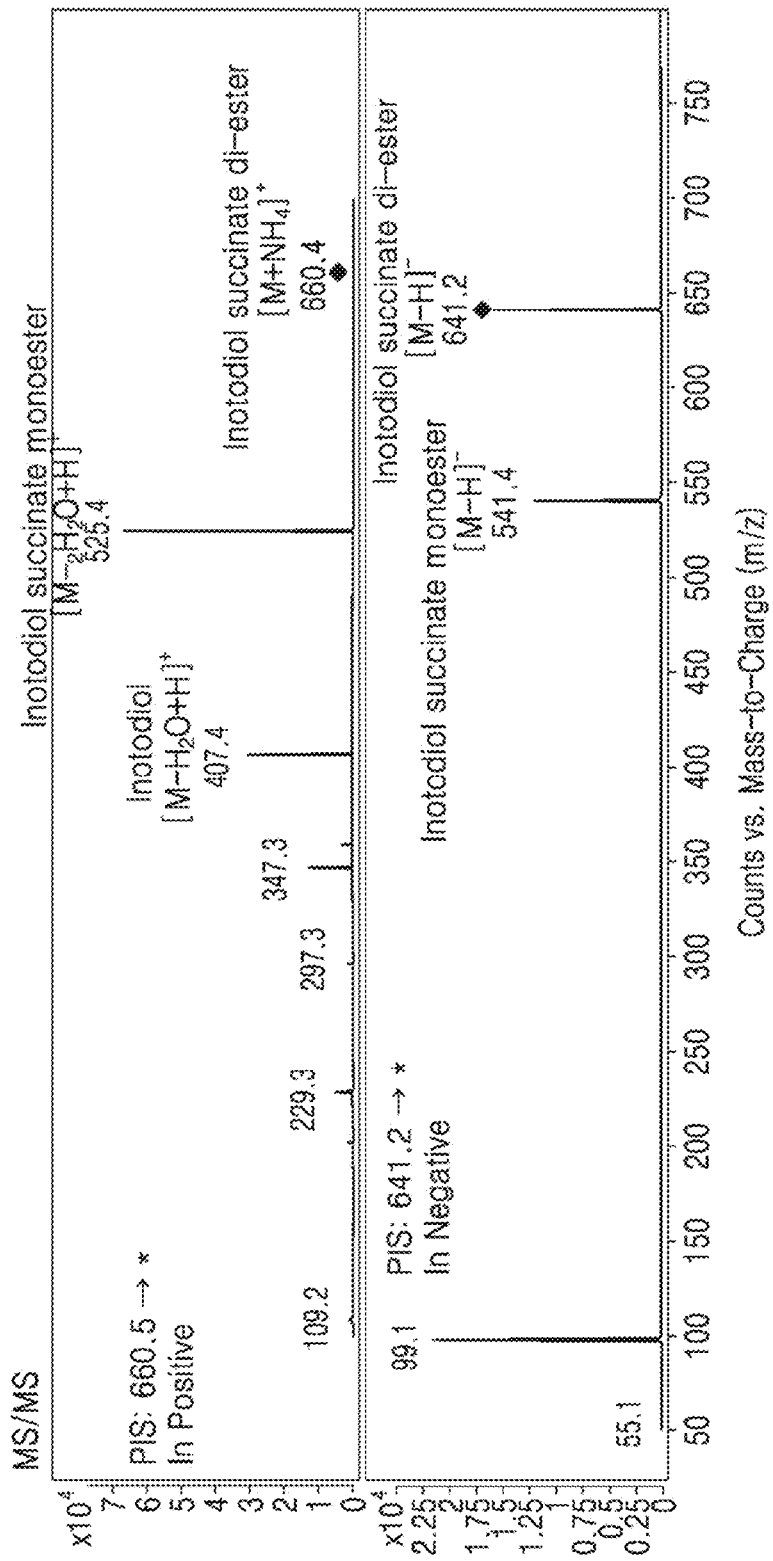
FIG. 6B illustrates the results of confirming the fragment pattern of the inotodiol succinate ester.

FIG. 6A illustrates the results of confirming the molecular weight of inotodiol succinate ester, and FIG. 6B illustrates the results of confirming the fragment pattern of the inotodiol succinate ester.

Figure 7A:
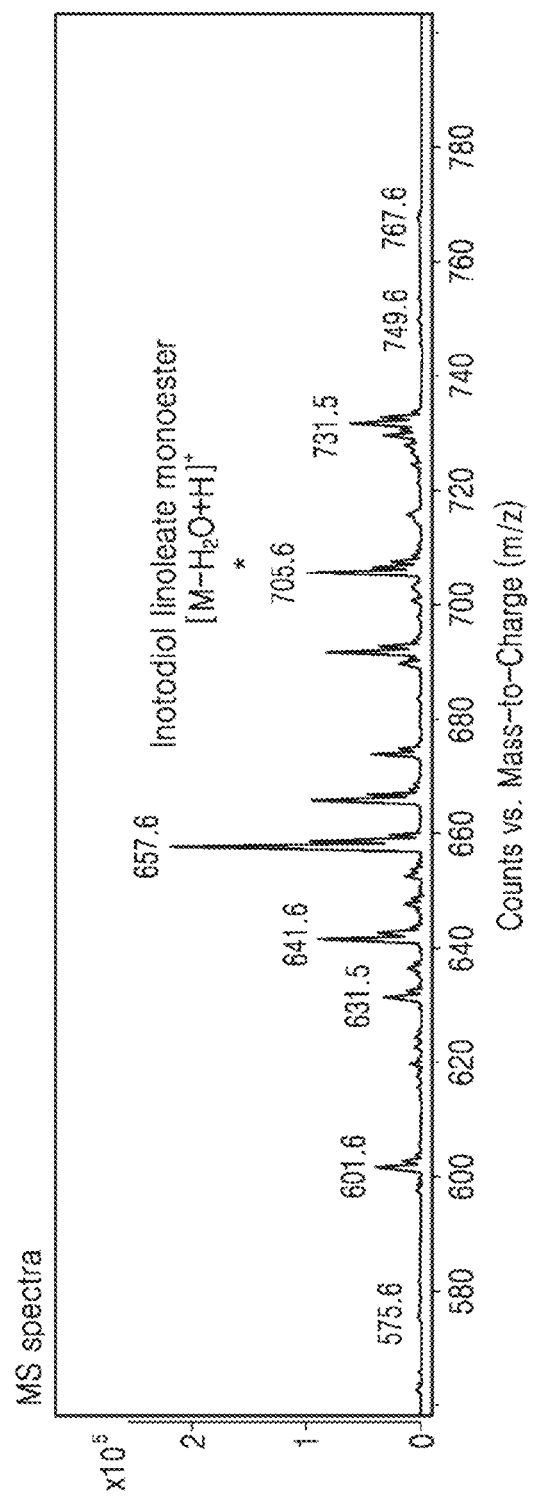
FIG. 7A illustrates the results of confirming the molecular weight of inotodiol linoleate ester.
Figure 7B:
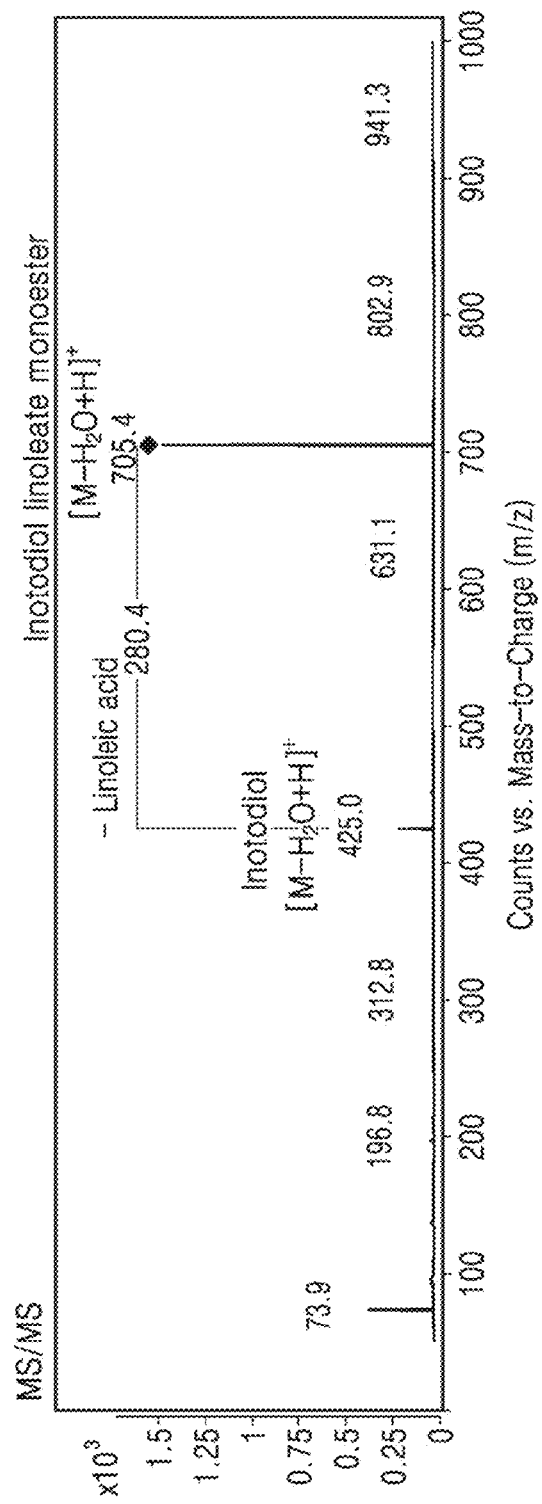
FIG. 7B illustrates the fragment pattern of the inotodiol linoleate ester.

FIG. 7A illustrates the results of confirming the molecular weight of inotodiol linoleate ester, and FIG. 7B illustrates the fragment pattern of the inotodiol linoleate ester.

Figure 8A:
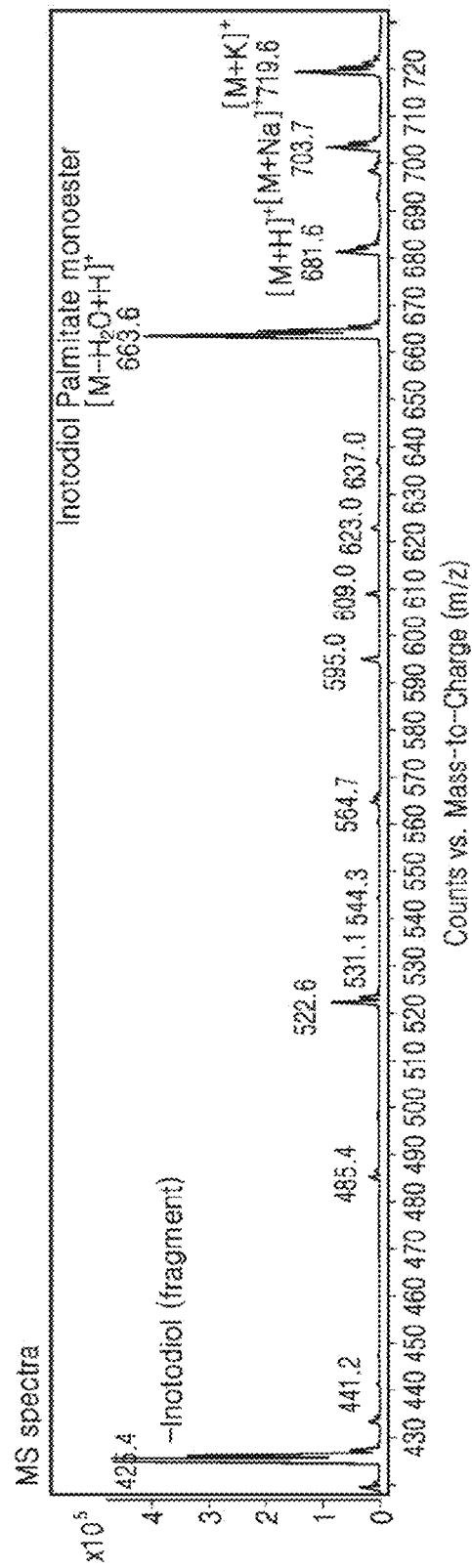
FIG. 8A illustrates the results of confirming the molecular weight of inotodiol palmitate ester.
Figure 8B:
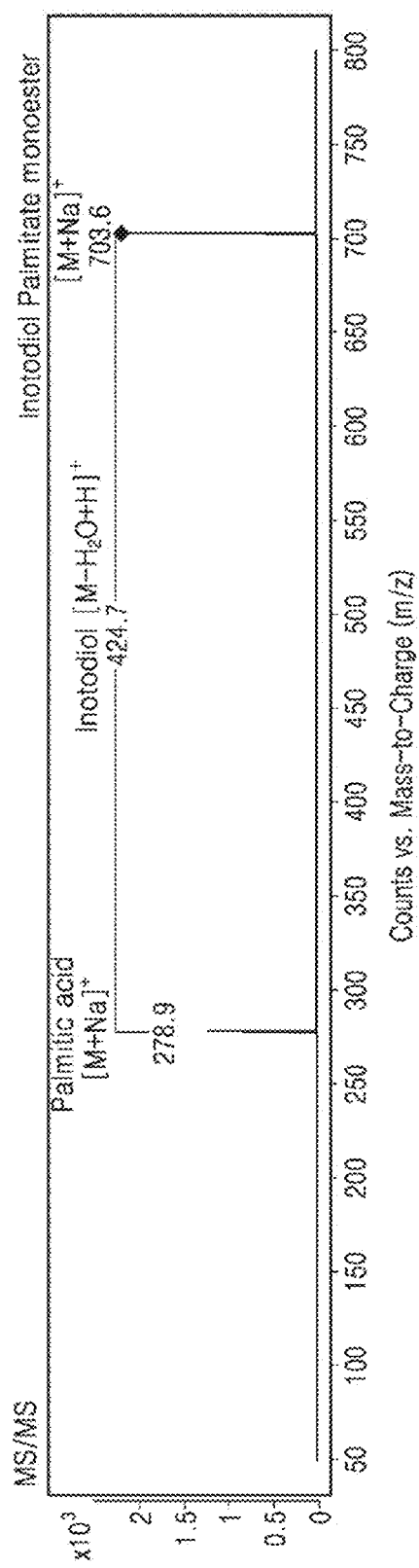
FIG. 8B illustrates the fragment pattern of the inotodiol palmitate ester.

FIG. 8A illustrates the results of confirming the molecular weight of inotodiol palmitate ester, and FIG. 8B illustrates the fragment pattern of the inotodiol palmitate ester.

Experimental Example 3. Nuclear Magnetic Resonance (NMR) Analysis

For NMR analysis, inotodiol oleate ester (5 mg) was dissolved in 600 μL of $CDCl_3$, and then transferred to an NMR tube (Eurisotop, Saint Aubin, France). $^1H$ NMR and $^{13}C$ NMR spectra were obtained with a Bruker Avance-III-600 (Bruker, Seongnam, South Korea) instrument at frequencies of 600.23 MHz and 150.93 MHz, respectively. The 2D heteronuclear multiple bond correlation (HMBC) was used to confirm the ester bond formation and chemical structure of inotodiol oleate ester. 2D HMBC NMR spectra were obtained using 32 scans for 13 hours. Data was processed using the educational version of TopSpin™ 4.0 software (Bruker).

As a result, the structure of inotodiol oleate ester was identified as illustrated in FIGS. 9 to 11.

Figure 9A:
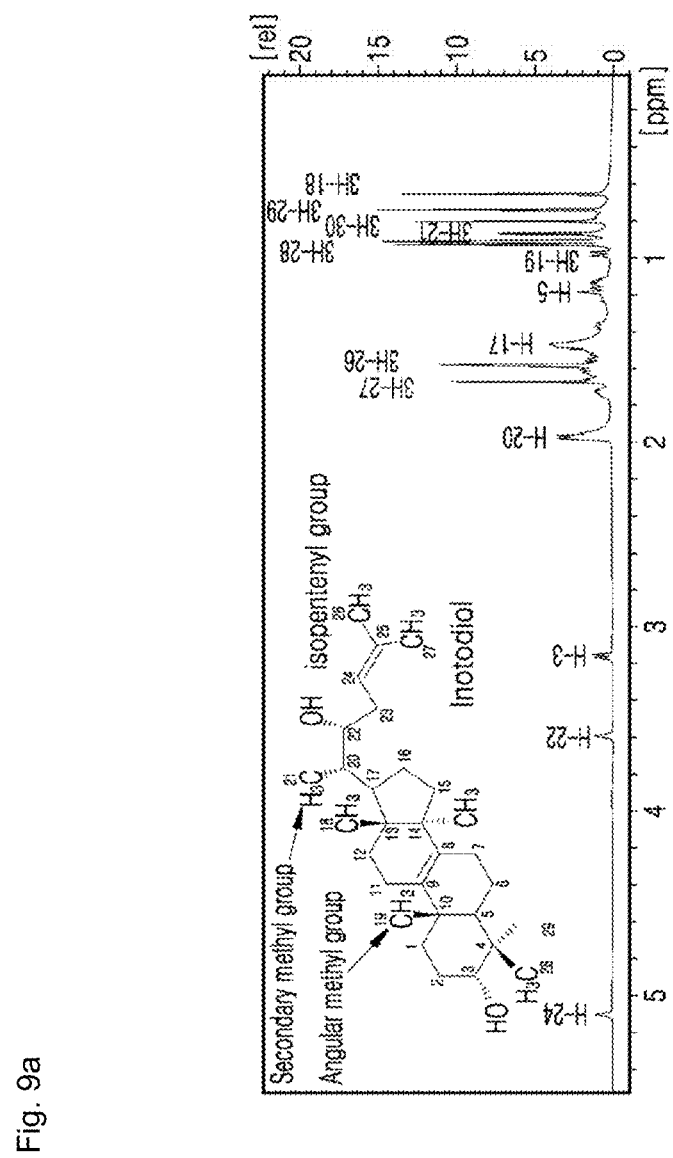
FIG. 9A illustrates the $^1$H-NMR results of inotodiol.
Figure 9B:
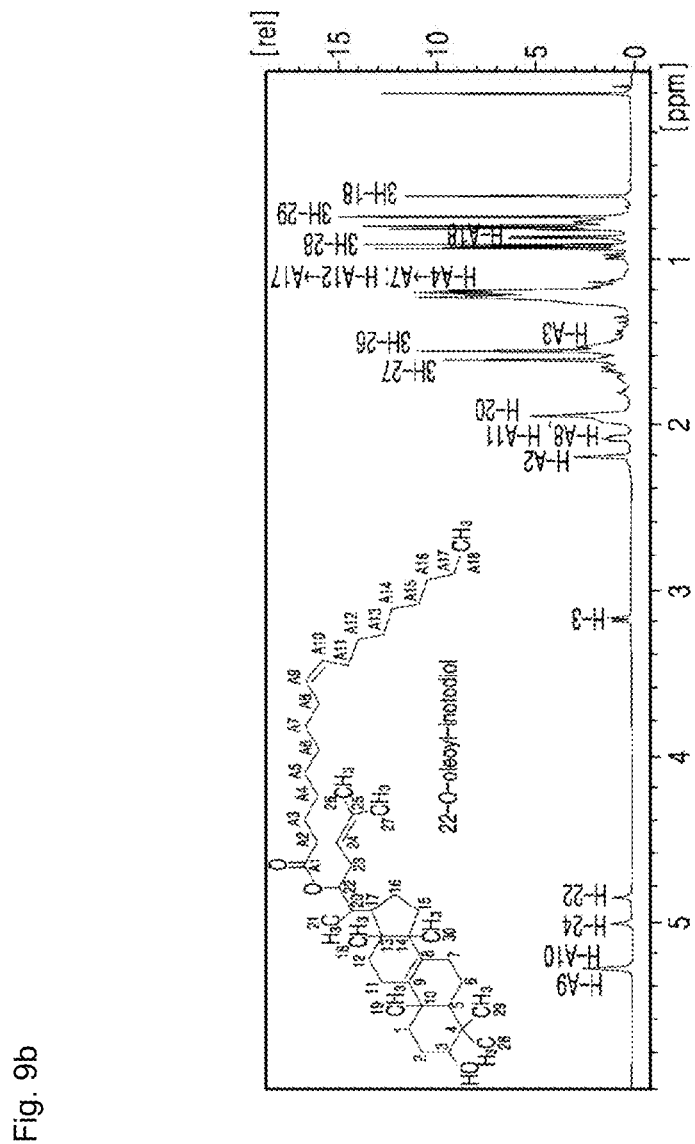
FIG. 9B illustrates the $^1$H-NMR results of 22-O-oleyl-inotodiol.
Figure 9C:
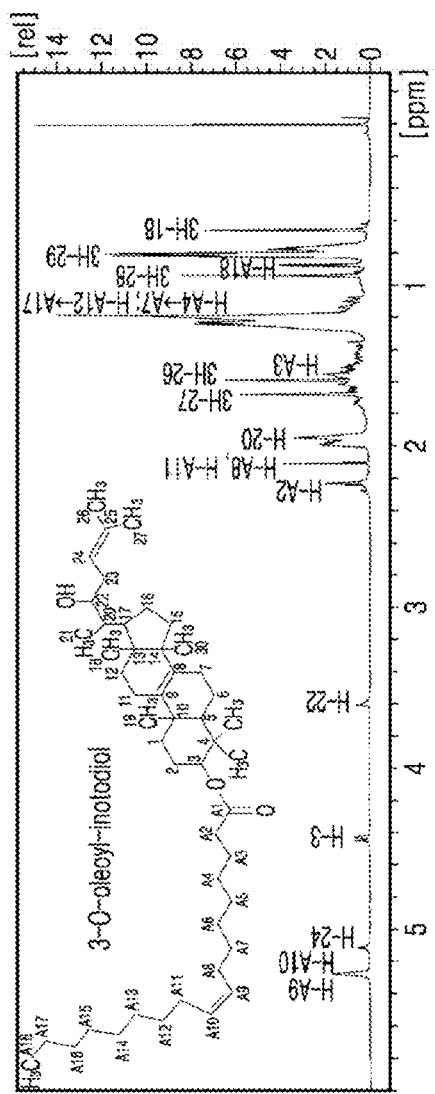
FIG. 9C illustrates the $^1$H-NMR results of 3-O-oleyl-inotodiol.

FIG. 9A illustrates the $^1H$-NMR results of inotodiol, FIG. 9B illustrates the $^1H$-NMR results of of 22-O-oleyl-inotodiol, and FIG. 9C illustrates the 1H-NMR results of 3-O-oleyl-inotodiol.

Figure 10A:
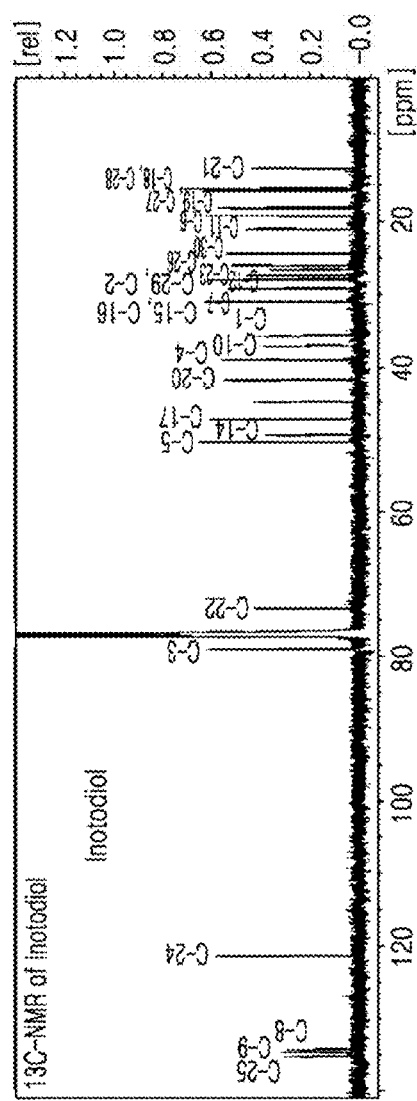
FIG. 10A illustrates the $^{13}$C-NMR results of inotodiol.
Figure 10B:
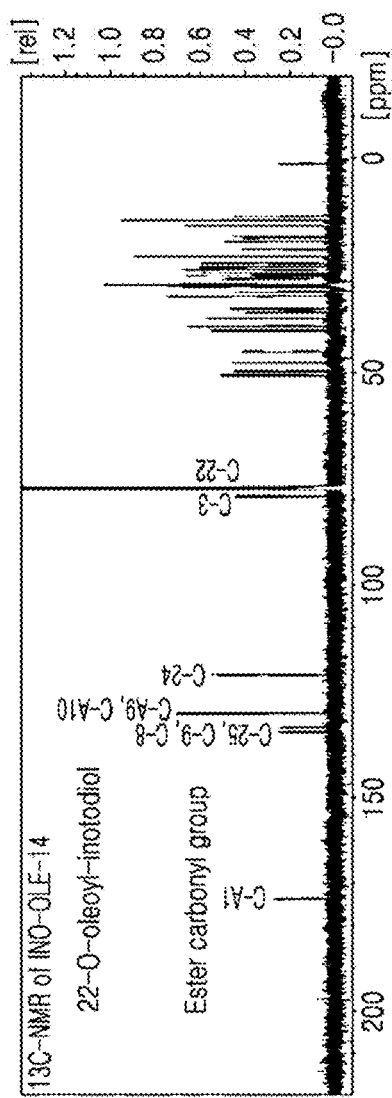
FIG. 10B illustrates the $^{13}$C-NMR results of 22-O-oleyl-inotodiol.
Figure 10C:
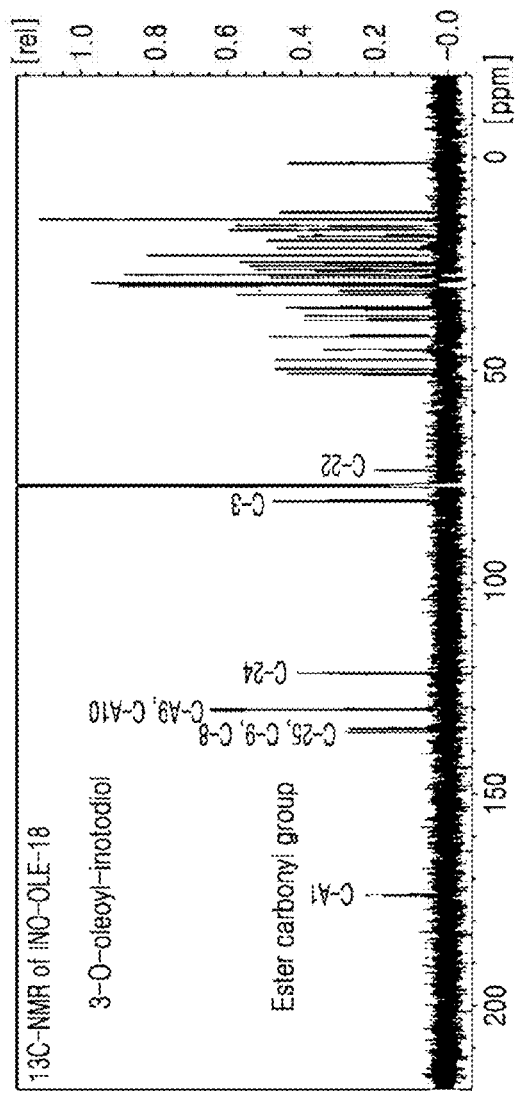
FIG. 10C illustrates the $^{13}$C-NMR results of 3-O-oleyl-inotodiol.

FIG. 10A illustrates the $^{13}C$-NMR results of inotodiol, FIG. 10B illustrates the $^{13}C$-NMR results of of 22-O-oleyl-inotodiol, and FIG. 10C illustrates the $^{13}C$-NMR results of 3-O-oleyl-inotodiol.

Figure 11A:
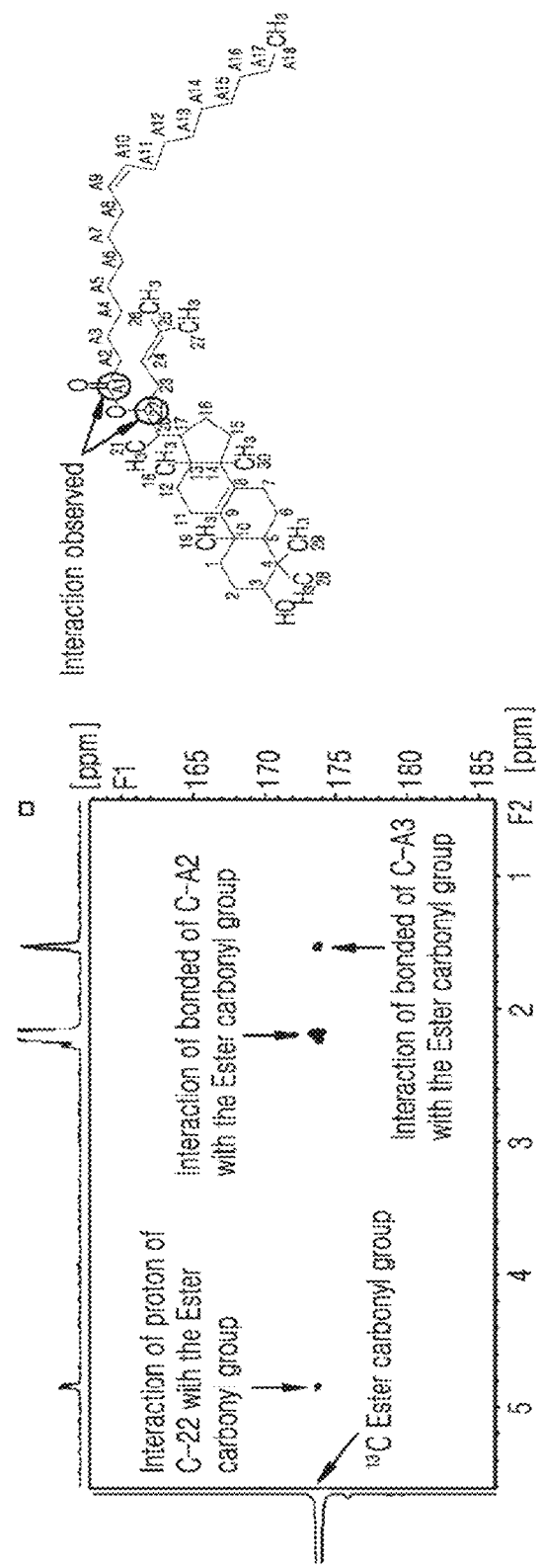
FIG. 11A illustrates the 2D $^1$H-$^{13}$C HMBC results of 22-O-oleyl-inotodiol.
Figure 11B:
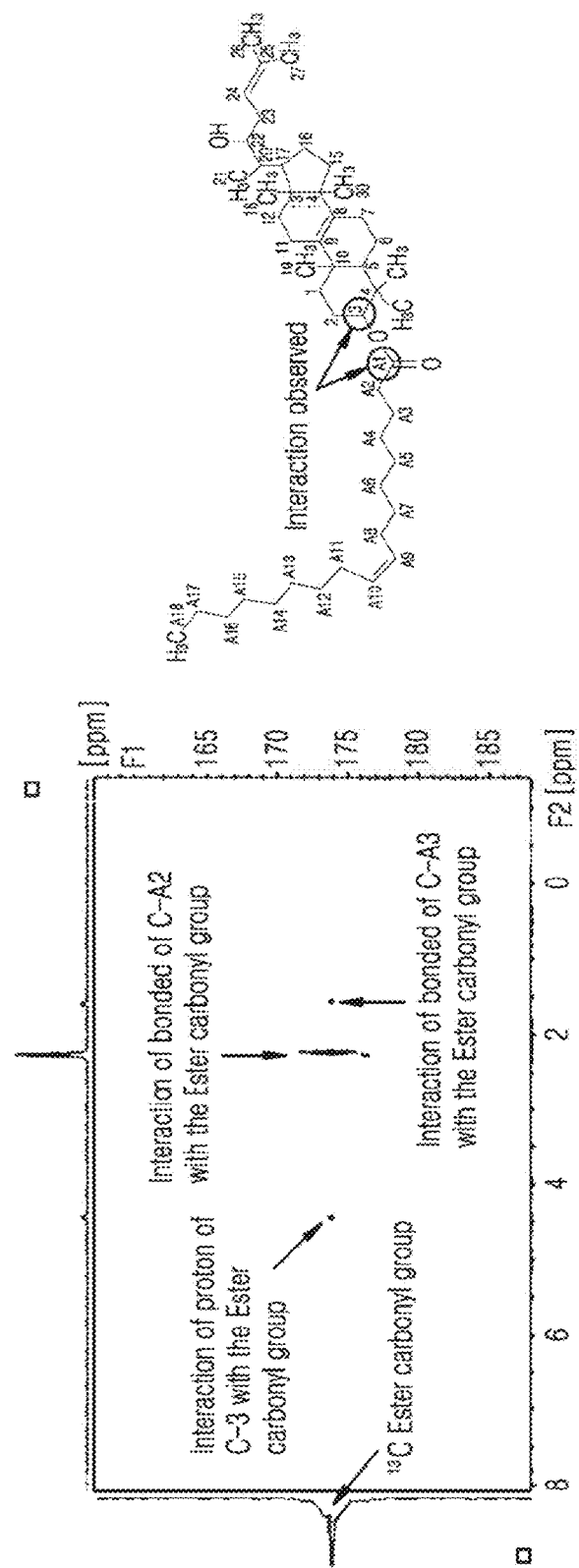
FIG. 11B illustrates the 2D $^1$H-$^{13}$C HMBC results of 3-O-oleyl-inotodiol.

FIG. 11A illustrates the 2D $^1H$-$^{13}C$ HMBC results of 22-O-oleyl-inotodiol, and FIG. 11B illustrates the 2D $^1H$-$^{13}C$ HMBC results of 3-O-oleyl-inotodiol.

Experimental Example 4. Differential Scanning Calorimetry (DSC)

The thermal analysis of inotodiol oleate ester and inotodiol succinate ester was performed on a DSC-1 instrument (Mettler Toledo, Greifensee, Switzerland). Approximately 2 mg of each dried sample was placed in a sealed aluminum pan. Then, the pan was heated from 25° C. to 400° C. at a rate of 10° C./min under a nitrogen atmosphere. An empty pan was used as a reference.

As a result, as illustrated in FIGS. 12 and 13, it was confirmed that inotodiol oleate ester and inotodiol succinate ester had lower melting points than inotodiol.

Figure 12A:
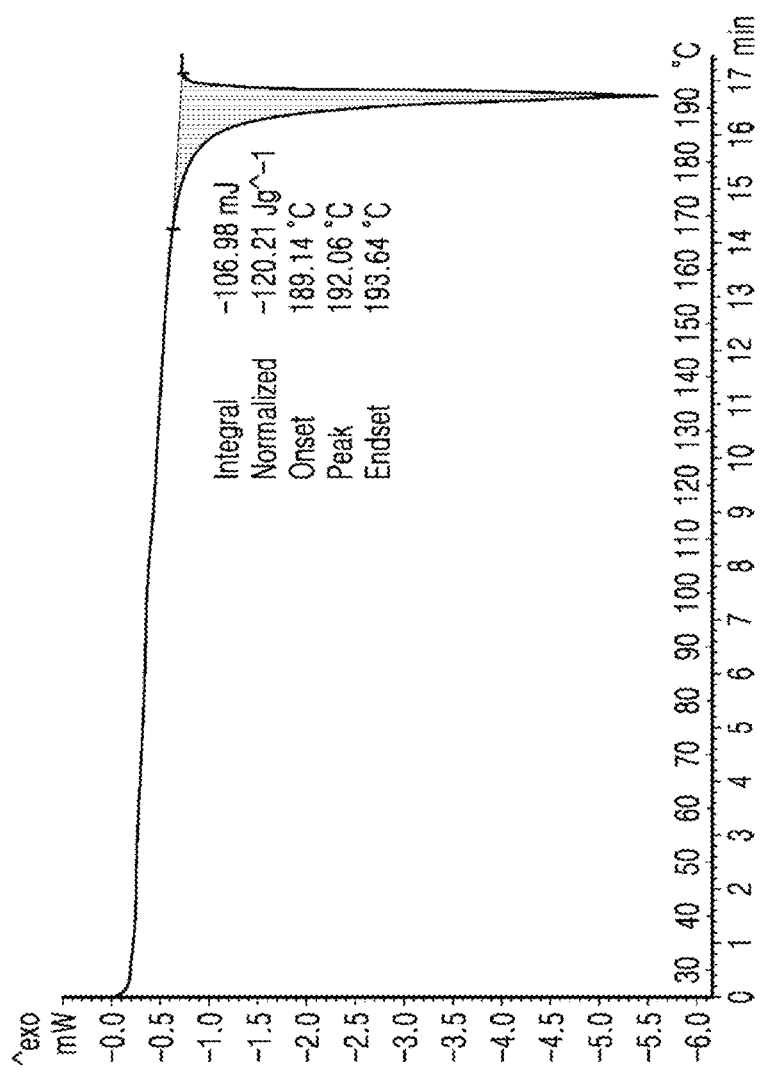
FIG. 12A illustrates the DSC results of inotodiol.
Figure 12B:
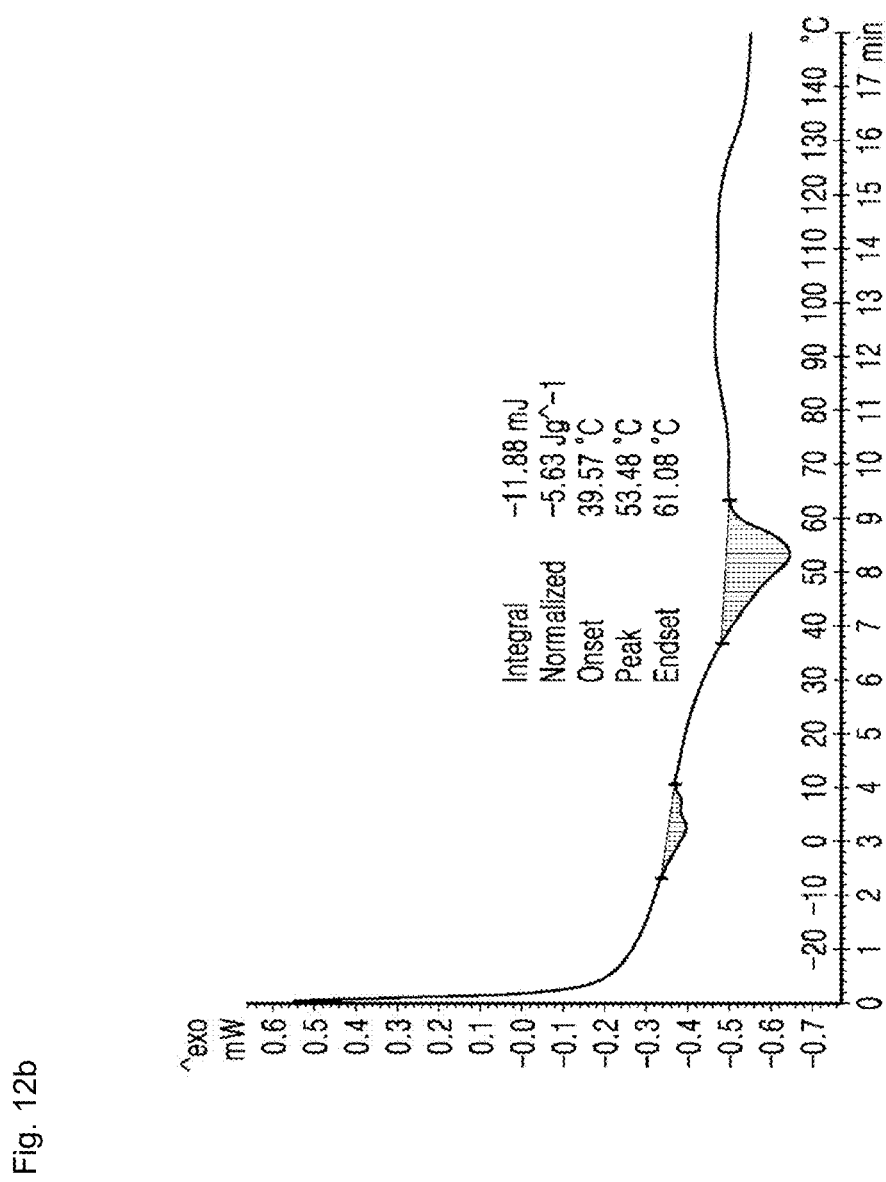
FIG. 12B illustrates the DSC results of inotodiol oleate ester.

FIG. 12A illustrates the DSC results of inotodiol, and FIG. 12B illustrates the DSC results of inotodiol oleate ester.

Figure 13A:
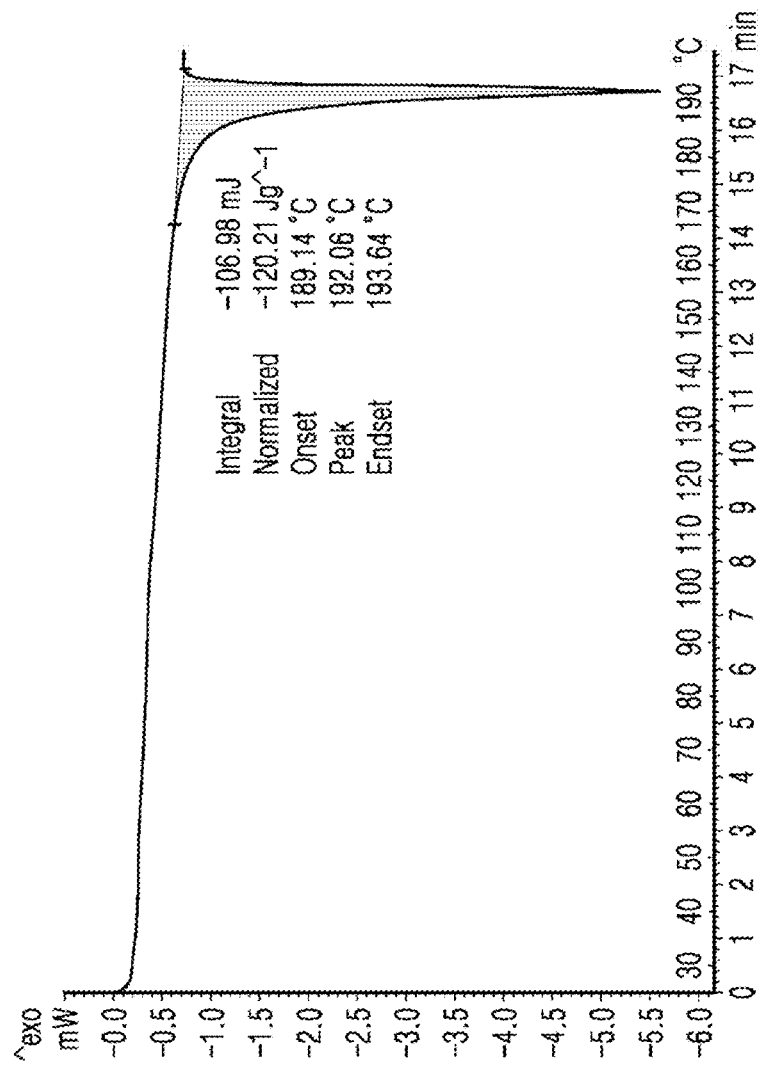
FIG. 13A illustrates the DSC results of inotodiol.
Figure 13B:
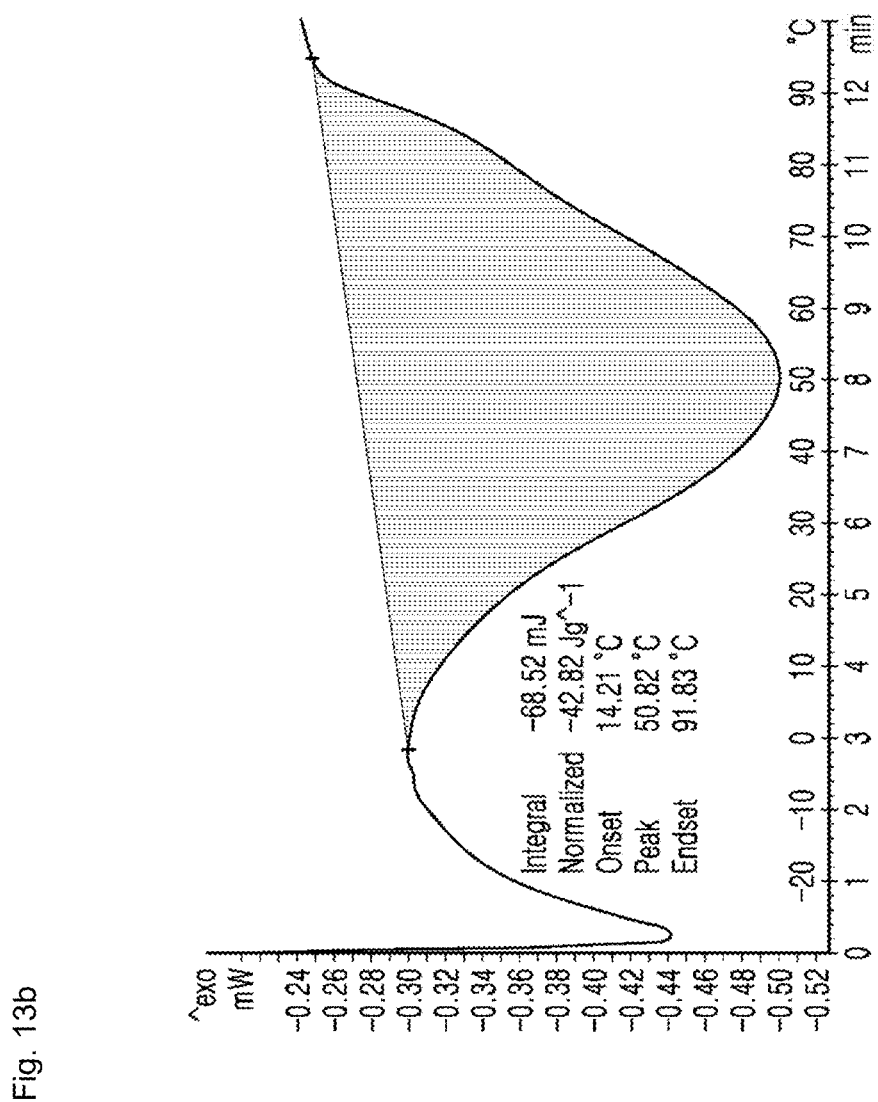
FIG. 13B illustrates the DSC results of inotodiol succinate ester.

FIG. 13A illustrates the DSC results of inotodiol, and FIG. 13B illustrates the DSC results of inotodiol succinate ester.

Experimental Example 5. Fourier Transform Infrared Spectroscopy (FT-IR)

FT-IR analysis was performed on inotodiol oleate ester and inotodiol succinate ester. Infrared spectra were recorded on a vacuum infrared spectrometer (VERTEX 80v) at a ratio of about 1 mg of sample to 100 mg of KBr (1:100). The spectra were obtained from averaged scans at a frequency ranging from 4000 cm-1 to 400 cm-'1.

As a result, as illustrated in FIGS. 14 and 15, the structures of inotodiol oleate ester and inotodiol succinate ester were identified.

Figure 14A:
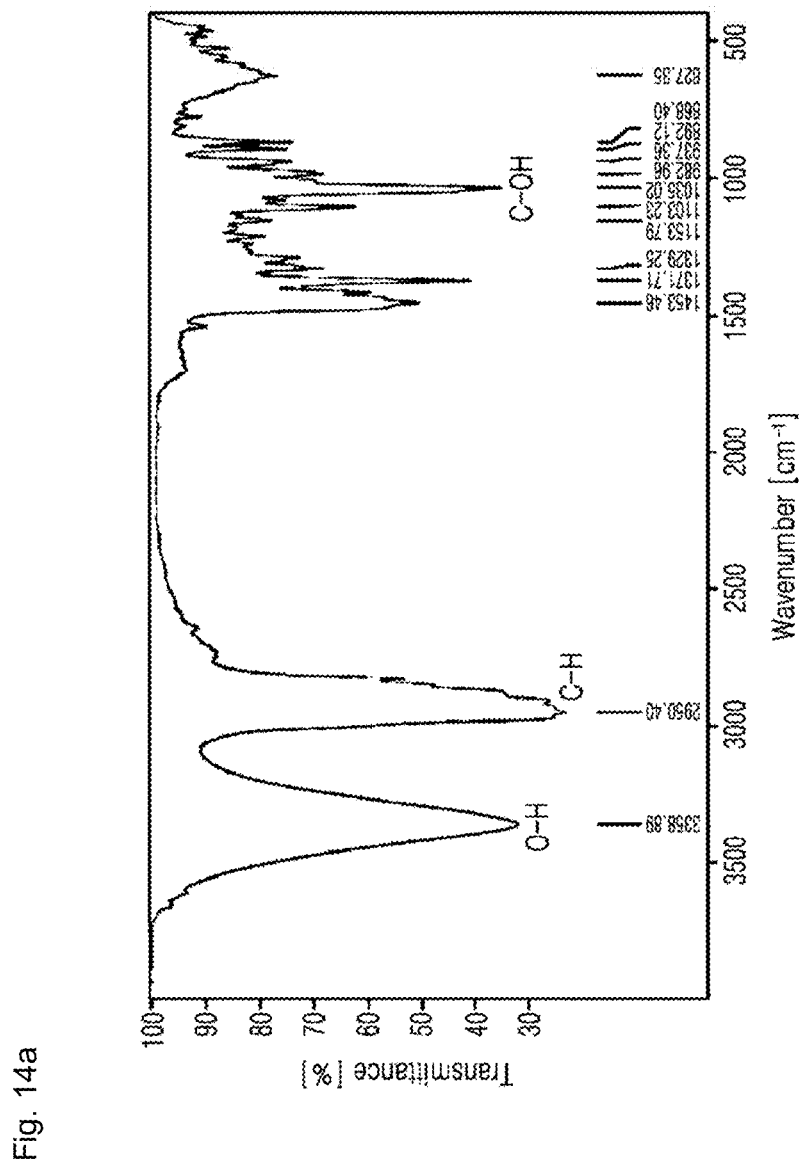
FIG. 14A illustrates the FT-IR results of inotodiol.
Figure 14B:
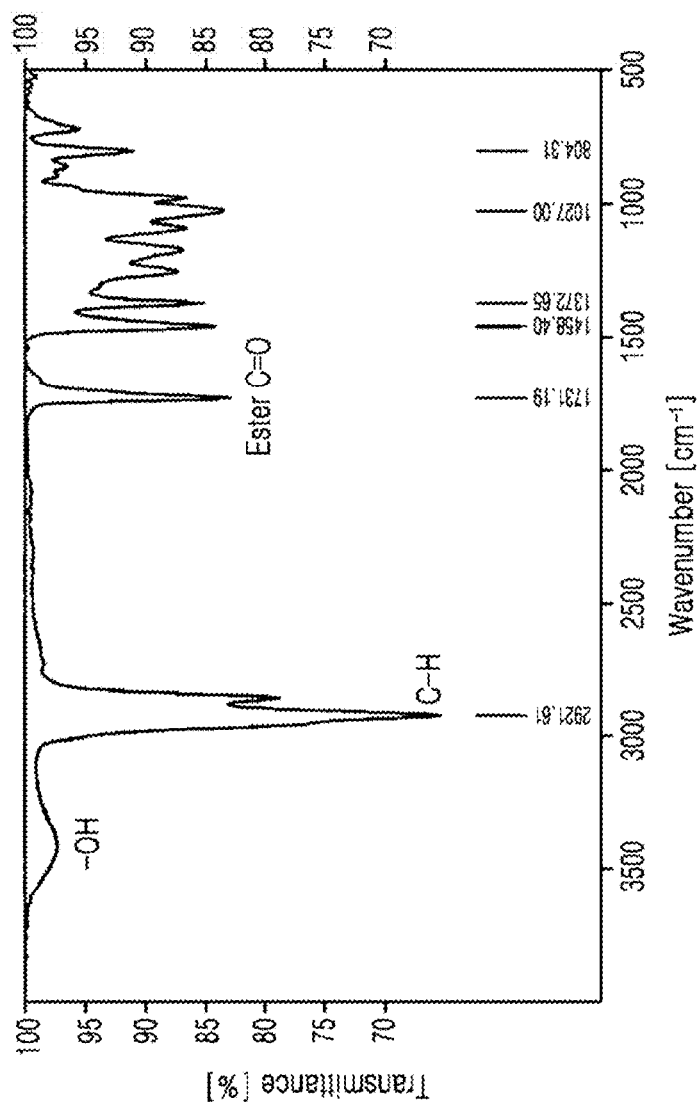
FIG. 14B illustrates the FT-IR results of inotodiol oleate ester.

FIG. 14A illustrates the FT-IR results of inotodiol, and FIG. 14B illustrates the FT-IR results of inotodiol oleate ester.

Figure 15A:
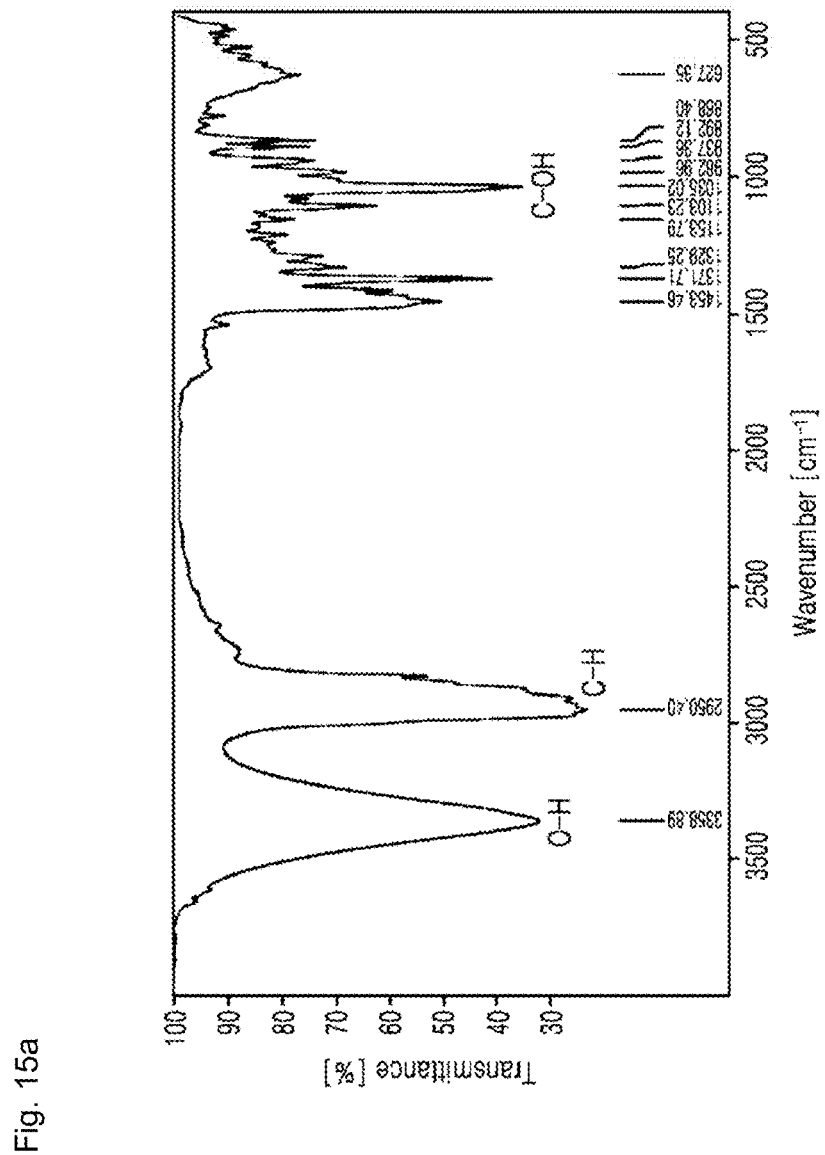
FIG. 15A illustrates the FT-IR results of inotodiol.
Figure 15B:
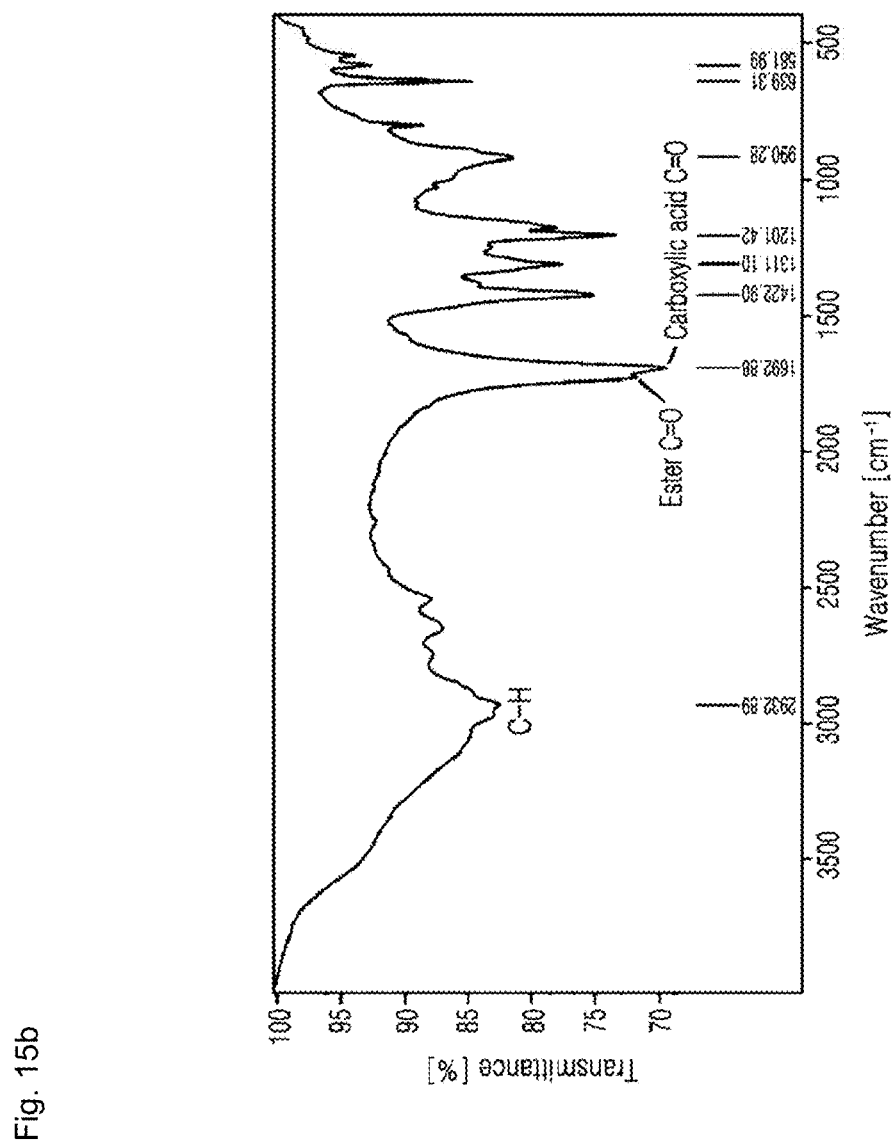
FIG. 15B illustrates the FT-IR results of inotodiol succinate ester.

FIG. 15A illustrates the FT-IR results of inotodiol, and FIG. 15B illustrates the FT-IR results of inotodiol succinate ester.

Experimental Example 6. Confirmation of Solubility of Inotodiol Fatty Acid Esters To measure the solubility of inotodiol esters with respect to water, 5 mg of each sample was suspended in 1 mL of distilled water and treated in an ultrasonic bath for 30 minutes. The mixture was then treated in an ultrasonic bath (Power sonic 410) for 30 minutes. Then, the mixture was incubated at 30° C. for 3 hours. The supernatant obtained after centrifugation (20,000×g, 10 minutes) was filtered through a 0.45 μm membrane filter of ADVANTEC (Tokyo, Japan) to remove undissolved crystals. Inotodiol succinate ester measurements were performed on Agilent-1290 UPLC/6470A (Agilent Technologies Korea, Seoul, South Korea). The concentration of inotodiol succinate ester in the supernatant was calculated using an established standard curve (0-5 mg/mL, $R^2=0.9998$).

As a result, as shown in Tables 2 and 3 below, it was confirmed that the solubility of inotodiol fatty acid esters as precursors was higher than that of inotodiol.

TABLE 2

| Concentration (mg/L) | |
|---|---|
| Inotodiol | Inotodiol succinate ester |
| 0.50 ± 0.18 | 2.71 ± 0.25 |

TABLE 3

| Compound | Concentration (mg/mL) |
|---|---|
| Inotodiol | 31 ± 3.8 |
| Inotodiol palmitate | 452 ± 3.8 |
| Inotodiol oleate (liquid) | >1000 |
| Inotodiol linoleate (liquid) | >1000 |

The above description of the present disclosure is provided only for illustrative purposes, and it will be understood by those of ordinary skill in the art to which the present disclosure pertains that the disclosure may be embodied in various modified forms without departing from the technical spirit or essential characteristics thereof. Thus, the embodiments described herein should be considered in an illustrative sense only and not for the purpose of limitation.

The invention claimed is:

1. An inotodiol ester derivative compound formed through an ester condensation reaction between a hydroxyl group of an inotodiol compound of Formula 1 below and a carboxyl group of a fatty acid, glucuronic acid, alkyl succinic anhydride, or phenolic acid, or a pharmaceutically acceptable salt thereof:

[Formula 1]

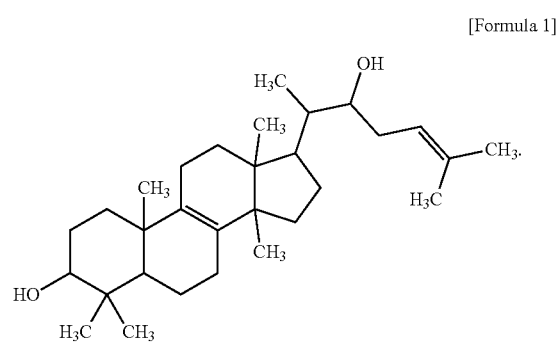 [SMILES: CC(C)=CCC(O)C(C)C1CCC2(C)C3=C(CCC12C)C1(C)CCC(O)C(C)(C)C1CC3]

2. The inotodiol ester derivative compound or the pharmaceutically acceptable salt thereof of claim 1, wherein the inotodiol ester derivative compound is represented by Formula 2 below:

[Formula 2]

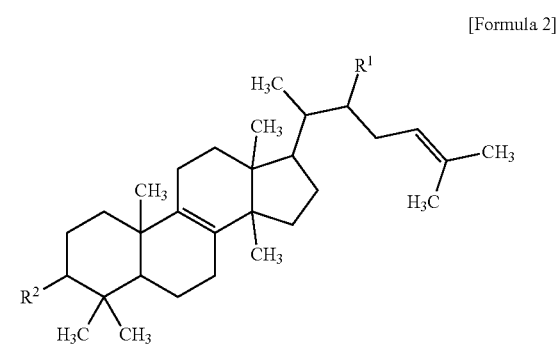

wherein, in Formula 2, R1 and R2 are each independently OH, or —OC(O)—R3 wherein R3 is a linear or branched alkyl, alkenyl or alkynyl chain having 1 to 30 carbon atoms, and at least one of R1 and R2 is —OC(O)—R3.

3. The inotodiol ester derivative compound or the pharmaceutically acceptable salt thereof of claim 2, wherein R3 is an unsubstituted linear alkyl or alkenyl chain having $CH_3(CH_2)_a$— or $CH_3(CH_2)_b(CH=CH(CH_2))_c(CH_2)_d$— wherein a is an integer of 8 to 24, b is an integer of 1 to 5, c is an integer of 1 to 6, and d is an integer of 3 to 7.

4. The inotodiol ester derivative compound or the pharmaceutically acceptable salt thereof of claim 1, wherein the fatty acid is an unsaturated fatty acid or a saturated fatty acid.

5. The inotodiol ester derivative compound or the pharmaceutically acceptable salt thereof of claim 3, wherein the unsaturated fatty acids is selected from the group consisting of myristoleic acid, palmitoleic acid, sapienic acid, oleic acid, elaidic acid, vaccenic acid, linoleic acid, linoelaidic acid, arachidonic acid, eicosapentaenoic acid, erucic acid, and docosahexaenoic acid.

6. The inotodiol ester derivative compound or the pharmaceutically acceptable salt thereof of claim 3, wherein the saturated fatty acid is selected from the group consisting of caprylic acid, capric acid, lauric acid, palmitic acid, stearic acid, arachidic acid, behenic acid, lignoceric acid, cerotic acid, and myristic acid.

7. The inotodiol ester derivative compound or the pharmaceutically acceptable salt thereof of claim 1, wherein the inotodiol and the fatty acid are mixed in a molar ratio of 1:10-30.

8. The inotodiol ester derivative compound or the pharmaceutically acceptable salt thereof of claim 1, wherein the phenolic acid is selected from the group consisting of p-coumaric acid, cinnamic acid, ferulic acid, 3,4-dihydroxy benzoic acid, p-hydroxy benzoic acid, vanilic acid, caffeic acid, syringic acid, and sinapinic acids.

* * * * *